United States Patent [19]

Burns et al.

[11] 3,921,138

[45] Nov. 18, 1975

[54] MULTIPOINT DATA COMMUNICATIONS SYSTEMS UTILIZING MULTIPOINT SWITCHES

[75] Inventors: Gary Joseph Burns, Atlantic Highlands; Edward Arthur Mohlenhoff, Bricktown; Gerald Philip Pasternack, Colts Neck, all of N.J.; Gary Wayne Strong, Ann Arbor, Mich.

[73] Assignee: Bell Telephone Laboratories, Incorporated, Murray Hill, N.J.

[22] Filed: Nov. 14, 1974

[21] Appl. No.: 523,576

[52] U.S. Cl. ............... 340/147 R; 178/3; 179/15 A; 179/18 ES

[51] Int. Cl.[2] ........................ H04Q 5/00; H04J 3/04

[58] Field of Search ............ 340/147 R, 152 R, 163; 178/2, 3; 179/15 A, 18 ES

[56] References Cited

UNITED STATES PATENTS

| | | | |
|---|---|---|---|
| 2,193,967 | 3/1940 | Kleinschmidt | 178/3 |
| 2,501,592 | 3/1950 | Bacon | 178/3 |
| 3,001,010 | 9/1961 | Mahony et al. | 178/2 |
| 3,529,293 | 9/1970 | Sullivan et al. | 340/163 |
| 3,576,539 | 4/1971 | Huber et al. | 340/152 |
| 3,775,565 | 11/1973 | Rutkowski | 179/18 ES |
| 3,815,093 | 6/1974 | Caretto et al. | 340/152 |
| 3,821,705 | 6/1974 | Chertok et al. | 340/152 R |
| 3,826,872 | 7/1974 | MacGregor | 179/15 A |
| 3,868,640 | 2/1975 | Binnie et al. | 340/163 X |

*Primary Examiner*—Donald J. Yusko
*Attorney, Agent, or Firm*—Roy C. Lipton

[57] ABSTRACT

In a multipoint data communications system a multipoint switch responds to polling signals on a signaling path from a central station by extending the signaling path to a selected one of a plurality of remote terminals. Thereafter the multipoint switch blinds itself to signals on the signaling path and remains blinded until there is an absence of signals on the signaling path for a predetermined interval of time. Communications apparatus at the selected remote terminal is enabled by a single frequency tone followed by a silent interval with the single frequency tone and the silent interval being common for all remote terminals.

27 Claims, 18 Drawing Figures

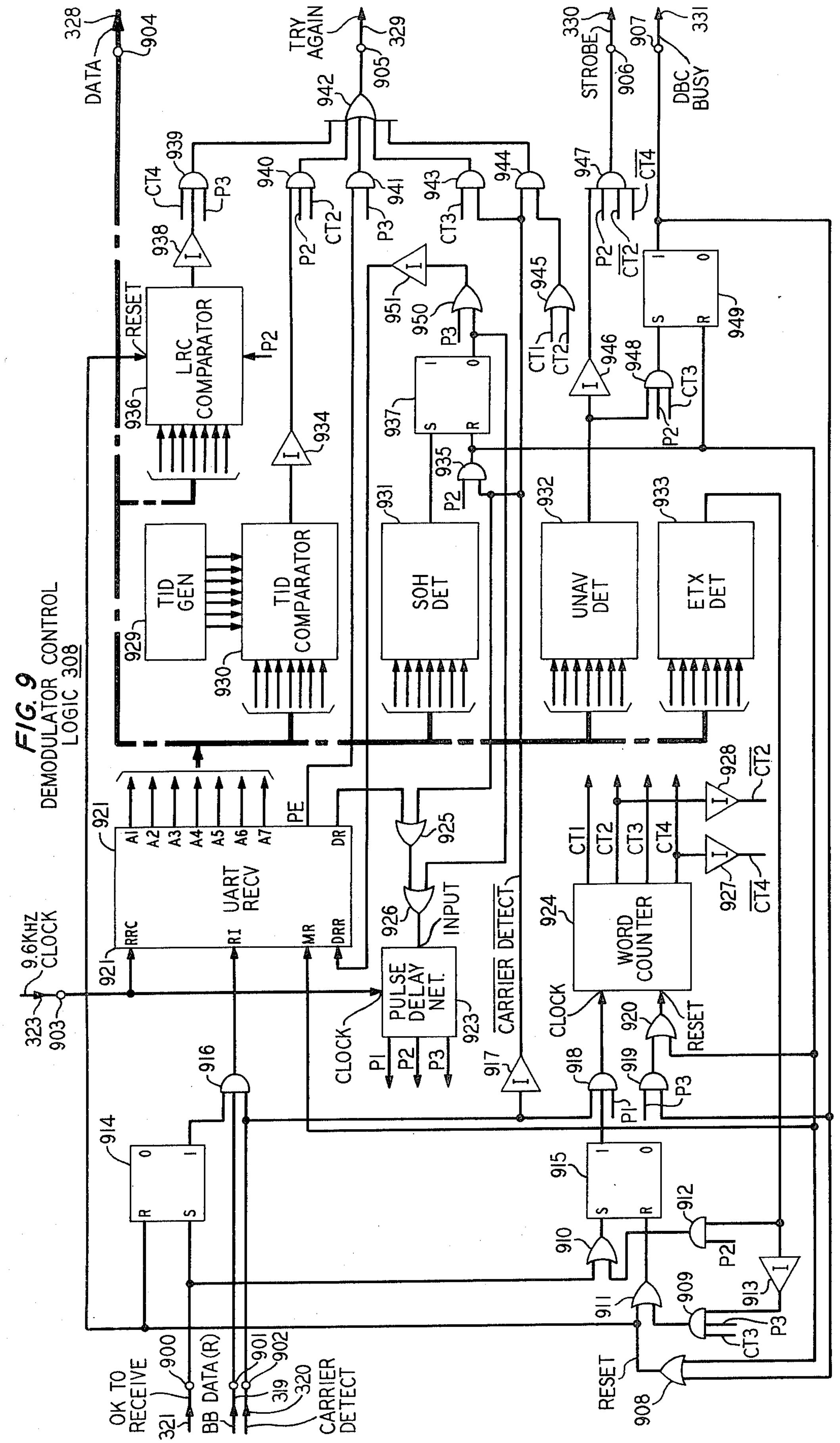
FIG. 9 DEMODULATOR CONTROL LOGIC 308

JOB A

JOB D

MULTIPOINT DATA COMMUNICATIONS SYSTEMS UTILIZING MULTIPOINT SWITCHES

FIELD OF THE INVENTION

This invention relates to multipoint data communication systems and more particularly to a multipoint data communication system which utilizes a multipoint switch.

DESCRIPTION OF THE PRIOR ART

Multipoint data communication systems function to selectively access a plurality of remote terminals from a central station. It is known in prior art multipoint data communication systems to link the remote terminals to the central station with a bridge circuit arrangement wherein all remote terminals connect to a common signaling path extending from the central station. The remote terminals are selectively accessed from the central station by transmitting remote terminal identification information to all remote terminals via the common signaling path. All remote terminals decode the identification information to determine the particular terminal being accessed. The chosen remote terminal is thereby enabled and initiates communication with the central station.

Two disadvantages are inherent in such an arrangement. First, as all remote terminals connect to a common signaling path, there is a lack of isolation between individual remote terminals. Therefore the failure of one remote terminal can adversely effect and even disable the entire system. Second, each remote terminal requires address decoding circuitry. This results in the duplication of circuitry, thereby increasing system cost and complexity.

It is therefore a broad object of this invention to provide an improved multipoint data communication system.

It is a further object of this invention to provide isolation between remote terminals in a multipoint data communication system.

It is a further object of this invention to access remote terminals in a multipoint data communication system without requiring duplication of address decoding circuitry at each remote terminal.

A known alternative to the bridge circuit arrangement is the use of a multipoint switch in a multipoint data communication system. In this arrangement, the central station transmits remote terminal address information on a signaling path to the multipoint switch. The switch, in response to this information, selectively extends the signaling path from the multipoint switch to the addressed remote terminal.

A problem with the use of a multipoint switch is the possibility that the switch may respond to other than valid address information. For example, during communication between the central station and a remote terminal, a bit sequence identical to an address of another terminal may be imbedded in a normal message. This could occur due to errors in transmission or to an address erroneously included in a normal message. The multipoint switch, in response to this bit sequence, will prematurely break the signaling path and disrupt system communications. Prior art methods of preventing this type of erroneous switch operation have included the use of various error checking schemes at the multipoint switch and the elimination of address characters from the signaling format. These methods require additional complex hardware at the switch and restraints on the signaling formats.

It is therefore a further object of this invention to provide an improved multipoint data communication system that does not require restraints on the signaling formats.

It is another object of this invention to reduce the complexity of the hardware required in prior art multipoint switches.

SUMMARY OF THE INVENTION

In accordance with one aspect of this invention, when the multipoint switch establishes a signaling path between a central station and a selected one of a plurality of remote terminals, it blinds itself to signals on the signaling path and remains blinded so long as data communication continues between the central office and the selected remote terminal. Switch operation is therefore precluded during system communication.

It is a feature of the invention that the switch is unblinded in response to the absence of signals on the signaling path for a predetermined interval of time.

It is another feature of the invention that the multipoint switch detects data communication sequences exceeding a predetermined maximum duration of time and in response thereto breaks the signaling path and unblinds itself. Therefore prolonged transmission sequences due to a central station or remote terminal malfunction will not disable the multipoint data communications system.

It is a further feature of the invention that a multipoint switch may be arranged to complete a signaling path to a remote terminal or to another multipoint switch. The multipoint data communications system can therefore be easily expanded to accommodate a large number of remote terminals.

In the illustrative embodiment disclosed herein, the central station polls the remote terminals by transmitting, to the multipoint switch, remote terminal address tones defining a selected one of the remote terminals followed by an interval of single frequency tone common to all remote terminals. Subsequent thereto, the central station ceases transmission, sending no tones for a predetermined silent interval. The multipoint switch responds to the remote terminal address tones by establishing the signaling path between the central station and the selected remote terminal. The selected remote terminal receives as a polling signal the common single frequency tone followed by the silent interval.

It is another feature of the invention that communication apparatus at the selected remote terminal is enabled in response to the common single frequency tone followed by the silent interval. Therefore each remote terminal in the multipoint data communications system responds to identical polling signals eliminating the need for complex address decoding circuitry at each remote terminal.

It is a further feature of the invention that the remote terminal ignores all data messages from the central station unless the remote terminal has transmitted a data message to the central station and is expecting a reply therefrom. Therefore a data message incorrectly addressed to a remote terminal not expecting a data message will be ignored.

The foregoing and other objects and features of this invention will be more fully understood from the following description of an illustrative embodiment thereof in conjunction with the accompanying drawings.

BRIEF DESCRIPTION OF THE DRAWINGS

In the drawings:

FIG. 9 discloses, in schematic form, the remote terminal's demodulator control logic;

Table of Contents

The system will be understood from the following detailed description which has been divided into the following sections.

1.0 General System Description
2.0 Multipoint Switch Description
2.1 Primary Switch Operation
2.2 Secondary Switch Operation
3.0 Remote Terminal Description
3.1 General Operation
3.2 Message-to-Send Mode of Operation
3.3 Reply Mode of Operation
4.0 Central Station Description

DETAILED DESCRIPTION

1.0 General System Description

Figure 1:
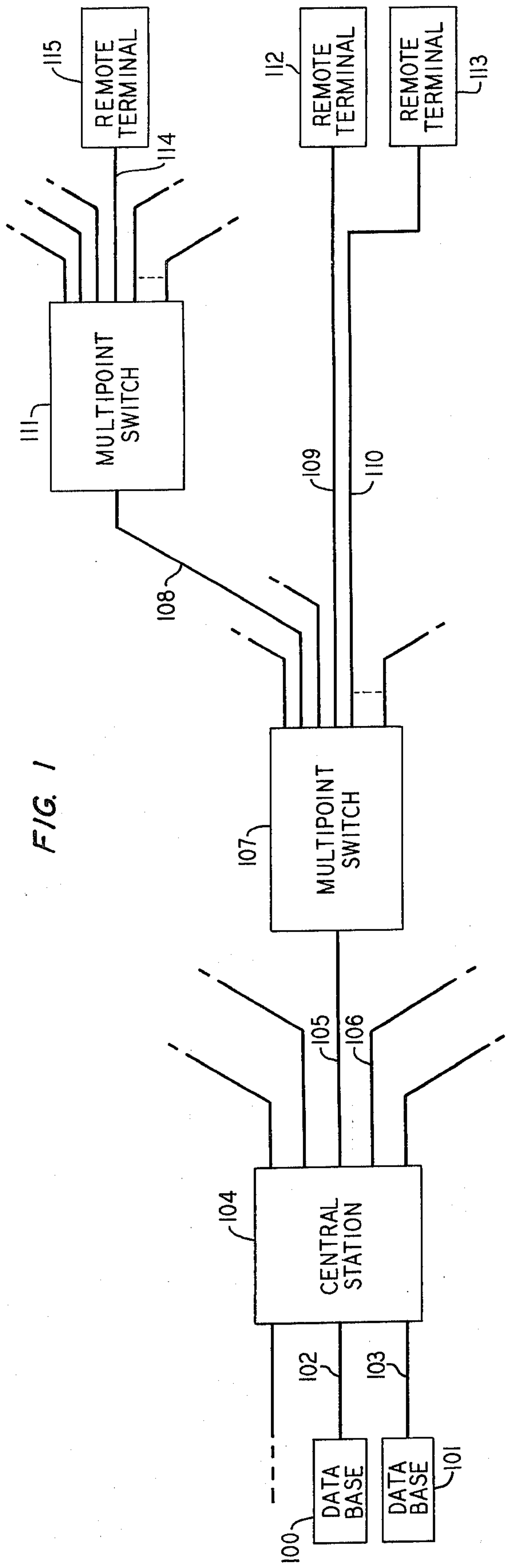
FIG. 1 discloses, in block form, a multipoint data communications system utilizing multipoint switches.

Refer to FIG. 1. Shown therein is a block diagram of a multipoint data communications system. Central station 104 is designed to communicate with a plurality of remote terminals such as remote terminals 112, 113 and 115 via multipoint switches 107 and 111. Information stored in data bases 100 and 101 is accessed by central station 104 and utilized in communication with the remote terminals. Data bases 100 and 101 and multipoint switches 107 and 111 may be located remote from central station 104, in which case lines 102, 103, 105 and 108 can be any suitable communications medium. In the preferred embodiment described herein, lines 102 and 103 are wideband data channels and lines 105 and 108 are two-wire private line voice-grade channels. Remote terminals 112, 113, and 115 may be local to multipoint switches 107 and 111 so that lines 109, 110 and 114 can be two-wire loops directly connected between the remote terminals and the multipoint switches. The system in FIG. 1 may be utilized to perform any of a variety of functions such as credit checking or alarm polling. The invention described herein is not limited, however, to any particular application to which the central station and remote terminals may be directed.

Figures 4, 4A:
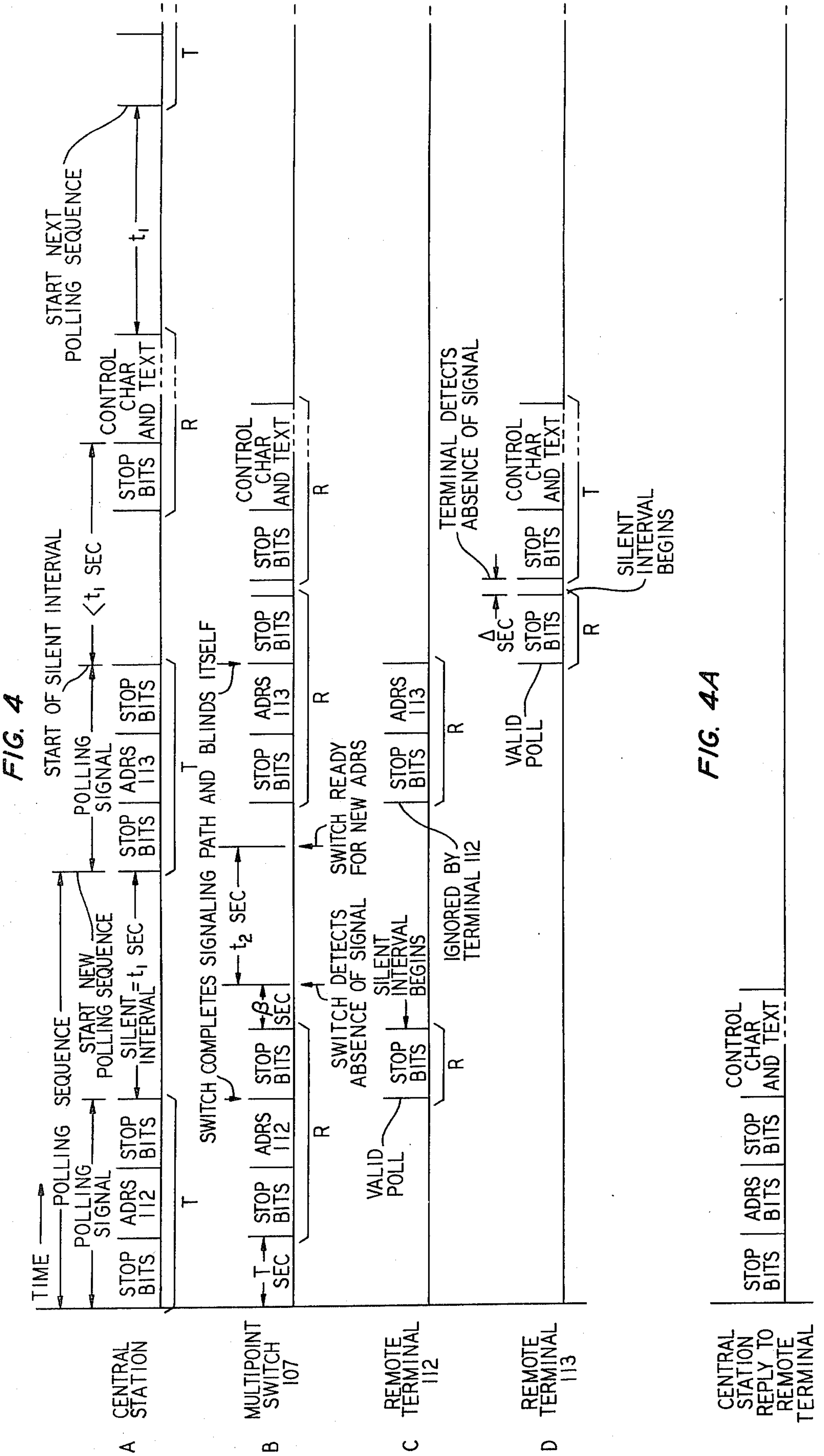
FIG. 4 discloses a timing diagram for the multipoint data communications system.
FIG. 4A discloses the format of a reply message sent to a remote terminal.

Refer to FIG. 4. Therein is shown a timing diagram which illustrates the sequential operation of the multipoint data communications system in FIG. 1. Line A in the timing diagram illustrates communication sequences involving the central station including sequences transmitted from the central station (marked by T), and communication sequences received at the central station (marked by R). Similarly, lines B-D illustrate communication sequences received at the multipoint switch (marked by R) and transmitted from and received at the remote terminals (marked by T and R, respectively).

Communications between the central station and the remote terminals is via Frequency Shift Keying (FSK) signaling. Therefore, the communication sequences shown in FIG. 4 are represented by bursts of FSK mark and space tones with a marking tone being equal to 1488 Hz and a spacing tone being equal to 1983 Hz.

The basic operation of the multipoint data communications system can be illustrated by referring to FIG. 1 and FIG. 4. Assume that central station 104 is to poll remote terminal 112 via line 105, multipoint switch 107, and line 109. The central station begins a polling cycle by transmitting a polling sequence consisting of a polling signal followed by a silent interval. As shown in FIG. 4, the polling signal consists of a first interval of stop bits (represented by FSK marking tone), a permutation of 1 and 0 bits defining the address of remote terminal 112 (represented by FSK mark and space tones) and a second interval of stop bits (represented by FSK marking tone). Subsequent to the polling signal, the central station ceases transmission for a silent (no tone) interval of $t_1$ seconds before the commencement of another polling sequence. During this silent interval, the central station looks for a response from the polled remote terminal.

The polling signal is transmitted over line 105 to a multipoint switch 107. The polling signal arrives at multipoint switch 107 (line B, FIG. 4) after a delay of T seconds which is due to the delay inherent in line 105. Switch 107 detects the first interval of stop bits and thereafter operates in response to the address tones defining remote terminal 112 to complete a signaling path (lines 105 and 109) between the central station and remote terminal 112. Subsequent thereto, the multipoint switch blinds itself to signals on the signaling path. The switch will remain blinded until it detects an absence of signals on the signaling path for an interval of time greater than $t_2$ seconds. After this interval the switch will unblind itself in preparation for a new address.

Terminal 112, upon the completion of the signal path (lines 105 and 109), receives the second interval of FSK marking tone (the second interval of stop bits) followed by the silent interval (see FIG. 4, line C). This interval of tone, followed by a silent interval, is a valid polling signal for all remote terminals. If, at this time, remote terminal 112 had information to transmit to the central station, it would be enabled and respond to the valid polling signal by initiating communications with the central station.

Assuming remote terminal 112 has no message to send and therefore does not respond to the polling sequence, there is no further transmission on the signaling path. Multipoint switch 107 (FIG. 4, line B), detects the absence of signal $\beta$ seconds subsequent to the conclusion of the polling signal. (The interval of time, $\beta$ seconds, between the actual absence of signal and the detection thereof is due to the response time of the multipoint switch detection circuitry). The multipoint switch, in response to the absence of signal on the signaling path for an interval of $t_2$ seconds, unblinds itself and is ready for a new address from the central station. Note that the interval of $t_2$ seconds is less than the interval of $t_1$ seconds so that the multipoint switch will be ready for a new address before the central station begins a new polling sequence.

At the conclusion of the first polling sequence's silent interval (FIG. 4, line A) central station 104 begins transmitting the polling sequence for the next remote terminal which in this case is remote terminal 113 (FIG. 1). This next polling sequence, which includes the address of remote terminal 113, is received at multipoint switch 107 (FIG. 4, line B). The previously established signaling path (lines 105 and 109) has been maintained by multipoint switch 107. Therefore, the second polling signal portion including the first interval of stop bits and the address of remote terminal 113 is received at remote terminal 112 (FIG. 4, line C). This, however, is not a valid poll, as the stop bits are not followed by a silent interval, and is therefore ignored by remote terminal 112.

After decoding the address of remote terminal 113, multipoint switch 107 operates (FIG. 4, line B) and completes a signaling path (lines 105 and 110) between central station 104 and remote terminal 113 and also breaks the previously established signaling path (lines 105 and 109) between central station 104 and remote terminal 112. Multipoint switch 107 also blinds itself at this time. Remote terminal 113 thereupon receives a valid poll consisting of the second polling sequence's last interval of stop bits followed by the silent interval (FIG. 4, line D).

Remote terminal 113 detects the absence of signals on the signaling path $\Delta$ seconds after the beginning of the silent interval. (The delay of $\Delta$ seconds is due to the response time of the remote terminal's detection circuitry.) The interval of stop bits followed by the absence of signals indicates to the remote terminal that a valid poll has been received. Assuming that remote terminal 113 desires to communicate with the central station, the detection of a valid poll will enable it to initiate communications with the central station.

Remote terminal 113 thereupon transmits over line 110 an interval of stop bits, certain control characters to be detailed hereinafter, and the remote terminal message text (FIG. 4, line D). This is received at multipoint switch 107 (FIG. 4, line B) and at central station 104 (FIG. 4, line A). The remote terminal response is received at central station 104 in less than $t_1$ seconds from the conclusion of the last polling signal transmitted by the central station. Therefore the central station is at this time looking for responses from the remote terminal and has not yet begun another polling sequence. The central station thereupon processes the received message, communicates with one of the data bases defined in the remote terminal message, generates the address of remote terminal 113 based on the control characters, and transmits a return message to remote terminal 113 during the next polling cycle in a manner to be detailed hereinafter.

After processing the message from remote terminal 113, central station 104 will wait the required silent interval before beginning another polling sequence. During this interval, multipoint switch 107 will unblind itself as described above and will therefore be ready for the forthcoming polling sequence.

FIG. 1 also shows that the multipoint switches may be arranged in tandem to access remote terminals such as remote terminal 115. With such an arrangement, the aforementioned polling sequence is slightly modified. To access remote terminal 115, central station 104 transmits a tandem polling sequence to multipoint switch 107. The first polling sequence contains the address of multipoint switch 111 whereupon multipoint switch 107 establishes a signaling path (line 105 and line 108) between the central station and multipoint switch 111. Thereafter, switch 107 blinds itself to signals on the signaling path while maintaining the established signaling path. The immediately successive polling sequence contains the address of remote terminal 115 whereupon switch 111 extends the signaling path (line 114) to remote terminal 115. Thereafter, switch 111 blinds itself to signals on the signaling path while maintaining the extended signaling path. Communication between the central station and remote terminal 115 then proceeds as previously described. After an absence of signals on the signaling path for $t_2$ seconds, both multipoint switch 107 and multipoint switch 111 unblind themselves in preparation for subsequent polling sequences.

2.0 Multipoint Switch Description

2.1 Primary Switch Operation

Figure 2:
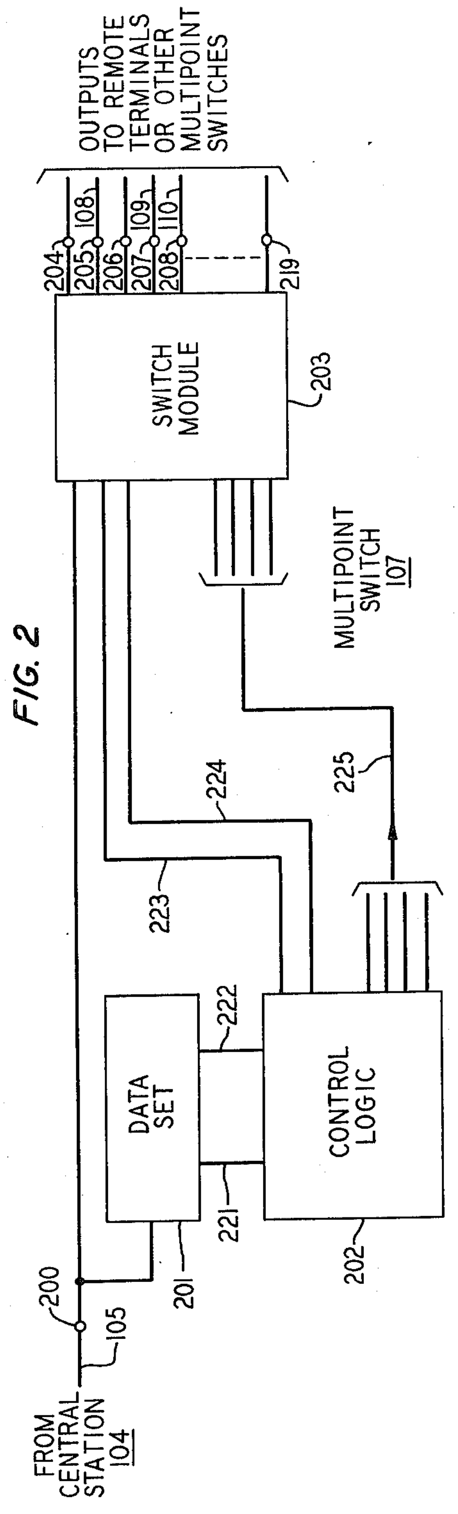
FIG. 2 discloses, in block form, a multipoint switch.

A block diagram of multipoint switch 107 is shown in FIG. 2. The following discussion will be directed to multipoint switch 107 but will also apply to multipoint switch 111 as both multipoint switches are physically identical.

The FSK polling signals from central station 104 are transmitted via line 105 to multipoint switch 107. The format of the polling signals has been described above and consists of an interval of FSK marking tone, followed by an FSK remote terminal address, followed by another interval of FSK marking tone. The first interval of FSK marking tone is used to charge line 105, i.e., the burst of FSK marking tone charges up the stray capacitance and inductance in line 105 to insure that the subsequent remote terminal address information will not be distorted by stray inductance and capacitance in the line.

The incoming polling signals on line 105 are received on input terminal 200 (FIG. 2) and applied to data set 201 and switch module 203. Data set 201 is an FSK data set of the type well known in the art and could, for example, be Bell System Data Set 202 or its equivalent. Data set 201 detects the incoming polling signals and in response thereto transmits a carrier detect signal to control logic 202 via lead 222. Data set 201 then decodes the polling signals and gates the baseband serial data derived therefrom to control logic 202 via lead 221.

Control logic 202 processes the baseband data in a manner to be detailed hereinafter and derives therefrom a 4-bit remote terminal address word which is applied in parallel to switch module 203 via line 225. Control logic 202 also applies a strobe pulse to switch module 203 via line 224. Control logic 202 then blinds itself to further serial data from data set 201 (which blinds the multipoint switch) and will remain blinded until there is an absence of signals on the signaling path for an interval of $t_2$ seconds.

In response to the 4-bit address word and the strobe pulse, switch module 203 connects input terminal 200 to one of output terminals 204 through 219 defined by the address word. Output terminals 204 through 219 are directed to remote terminals or other multipoint switches and could for example be connected to lines 108 or 109 in FIG. 1. The operation of switch module 203 connects central station 104 to a selected one of the remote terminals defined by the remote terminal address word. This connection will be maintained until control logic 202 becomes unblinded and accepts a new address word or until control logic 202 detects certain error conditions.

Control logic 202 is designed to detect two error conditions. The first is the existence of a parity error in the remote terminal address word. A parity error indicates an erroneous address word which could result in the connection of the central station to the wrong remote terminal. Therefore when this condition is detected control logic 202 transmits an idle pulse to switch module 203 via line 223. The idle pulse places switch module 203 in the idle state which opens all lines to the remote terminals and to other multipoint switches. The second error condition detected by control logic 202 is the occurrence of extended continuous transmission sequences from either the central station or a remote terminal. If continuous transmission sequences exceeding $t_3$ seconds are detected it indicates that either the central station or remote terminals have malfunctioned and are locked in the transmit mode. (The time $t_3$ is defined as an interval of time greater than the largest allowable message sent from the central station or a remote terminal.) When this condition is detected, control logic 202 places switch module 203 in the idle state via line 223 in the manner described above.

Figure 5:
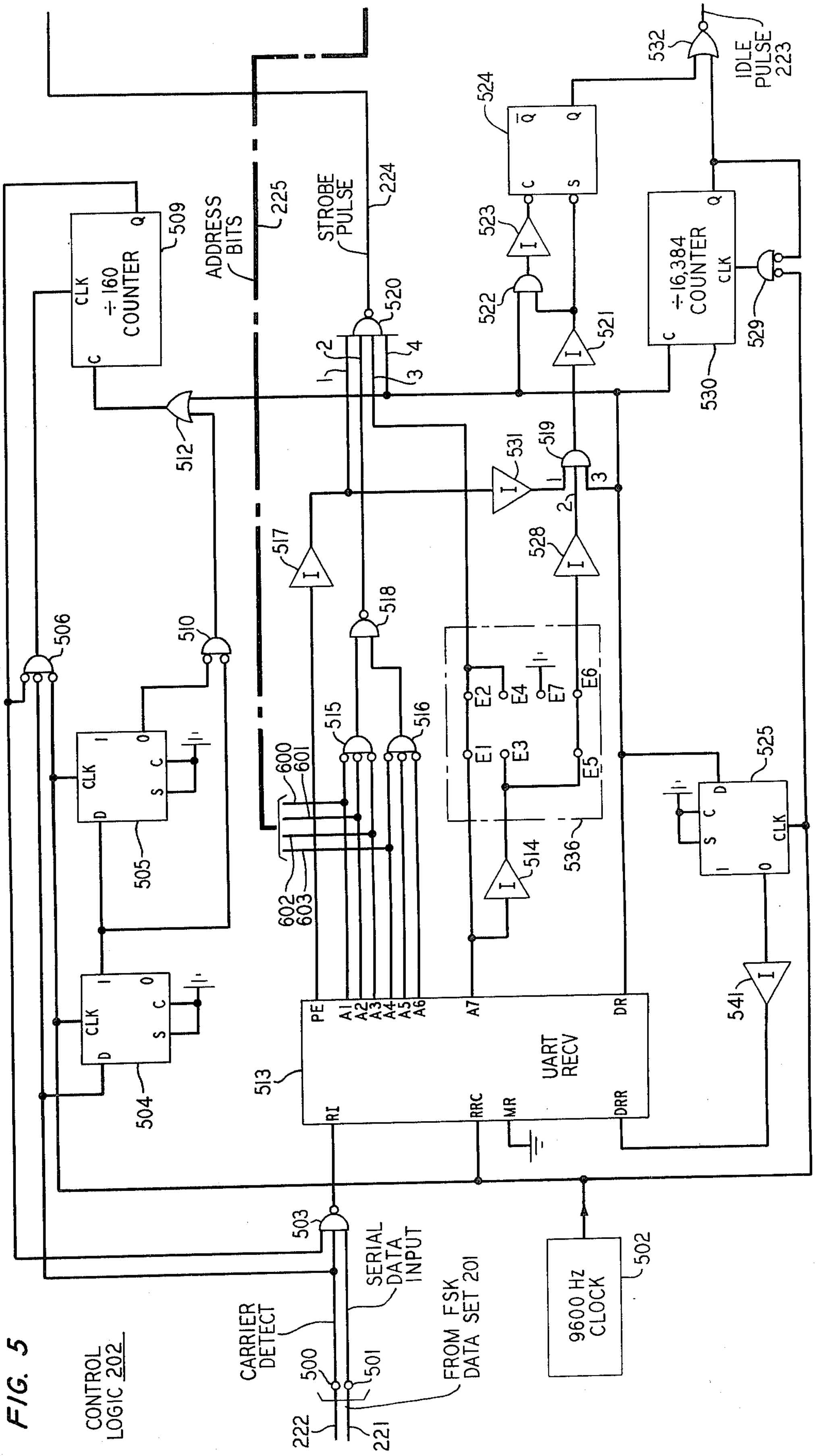
FIG. 5 and FIG. 6, when arranged side by side, disclose, in schematic form, the details of a multipoint switch.
Figure 6:
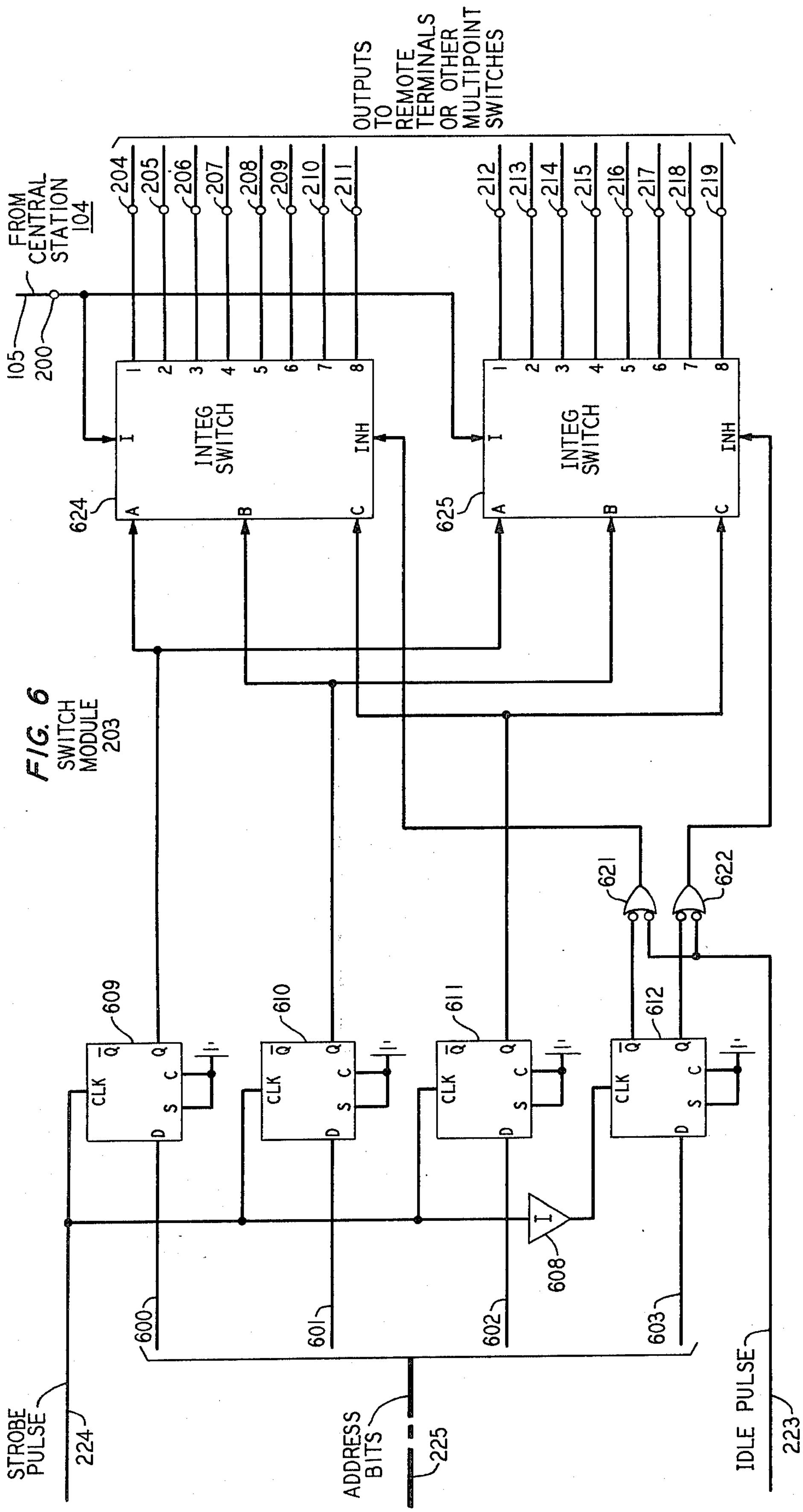

Refer to FIG. 5 and FIG. 6. When arranged side by side these two figures show detailed representation of the control logic and switch module of multipoint switch 107. Input terminal 500 receives the carrier detect signal from FSK data set 201 via line 222. Input terminal 501 receives the baseband serial data decoded from the FSK polling signals by FSK data set 201 via line 221. Clock 502 is a 9600 Hz free running clock used to provide timing for the control logic.

UART 513 is a commercially available integrated circuit (for example: the receive section of Western Digital Corporation's integrated circuit Asynchronous Receiver/Transmitter TR-1402A described in "TR-1402A Asynchronous Receiver/Transmitter Application Report No. 1," dated October 1972 and published by Western Digital Corp., 19242 Red Hill Ave., Newport Beach, Ca. 92663) used to provide serial to parallel conversion and parity checking for the incoming serial data. UART output DR is the data ready indication which goes high when the parallel data is applied to outputs A1-A7, and output PE goes high if there is a parity error in the incoming data. UART input DRR is the data ready reset input which in response to a high applied thereto initializes the UART in preparation for additional input data. The reinitialization causes the DR output to go low while maintaining the A1-A7 outputs in their present state. The A1-A7 outputs remain in their present state until additional input data is received. UART input MR is the master reset input which in response to a high applied thereto completely reinitializes the UART causing the A1-A7 outputs and the DR output to return low. UART inputs RI and RRC are the serial data and clock inputs respectively.

Counter 509 is a divide-by-160 counter which functions as a timer and serves to determine interval $t_2$ defined above. Counter 530 is a divide-by-16,384 counter, which also functions as a timer, and serves to determine interval $t_3$ defined above.

Primary/secondary straps 536 serve to configure a multipoint switch in either a stand-alone arrangement or in a tandem arrangement. For example, if multipoint switch 107 was used without multipoint switch 111 to access only remote terminals 112 and 113, then terminal E1 would be connected to terminal E2 and terminal E6 would be connected to terminal E7. If the multipoint switches are arranged in tandem as shown in FIG. 1, then multipoint switch 107 is the primary switch and multipoint switch 111 is the secondary switch. In this configuration, multipoint switch 107 has terminal E1 connected to terminal E2 and terminal E5 connected to E6. Similarly, multipoint switch 111 has terminal E3 connected to terminal E4 and terminal E6 connected to terminal E7.

Integrated switches 624 and 625, shown in FIG. 6, are commercially available integrated circuits such as RCA Corporation's integrated circuit CD4051A described in Catalog No. SSD203B entitled "RCA COS-MOS Digital Integrated Circuits." These switches serve to connect input terminal 200 to one of the output terminals 204-219. The integrated switches are responsive to three address bits and a select bit which together serve to select integrated switch 624 or 625 and one of the eight output lines dedicated to each switch. The manner in which this is accomplished is detailed hereinafter.

The operation of multipoint switch 107 will now be covered in detail. Incoming FSK polling sequences from central station 104 are applied via line 105 to the input of FSK data set 201 in FIG. 2 and input terminal 200 in FIG. 6. The arrival of the polling sequence is detected by FSK data set 201 which in response thereto applies a high (logical 1 bit) via line 222 to terminal 500 in FIG. 5. The polling sequence is decoded by FSK data set 201 and the baseband serial data derived therefrom is applied via line 221 to terminal 501 in FIG. 5. The baseband format of the polling sequence is as follows: the first interval of FSK marking tone is decoded into a series of marking (logical 1 ) bits, the remote terminal address is decoded into a start bit which is a logical 0, 6 information bits, a primary/secondary bit (high for a primary switch, low for a secondary switch), a parity bit and a stop bit which is a logical 1. The second interval of stop bits is also decoded into a series of marking bits.

The high applied to terminal 500 is applied to one input of gate 503, to the D input of flip-flop 504 and to one input of gate 506. Flip-flops 504 and 505 are at this time in the CLEAR state (as will be detailed hereinafter) so the 1 applied to the D input of flip-flop 504 sets this flip-flop. This applies a high to the D input of flip-flop 505 and a high to one inverted input of gate 510 thereby disabling this gate. Flip-flop 505 will therefore be SET on the next succeeding clock pulse. This has no effect as gate 510 is disabled. The Q output of counter 509 is at this time high, which is applied to one input of gate 506 (thereby disabling this gate) and to one input of gate 503. Gate 503 is thereby enabled and allows the baseband serial data arriving on input terminal 501 to be applied to the RI input of UART 513. The serial data is clocked into UART 503 by clock 502 which is applied to the RRC input of UART 513. UART 513 ignores the first interval of marking bits and detects the start bit which signifies the beginning of the remote terminal address. The UART then accepts the next 7 bits, checks parity and applies the 7 bits in parallel to the A1-A7 outputs of the UART. When the 7 bits are applied to the A1-A7 outputs, the DR output of the UART goes high. At this time, the PE output is low, which signifies no parity error (the consequences of a parity error will be detailed hereinafter), and the A7 output is high (multipoint switch 107 is a primary switch).

The four most significant bits of the remote terminal address are applied via line 225 to the D inputs of flip-flops 609-612 in FIG. 6. At this same time, the PE output of the UART applies a high to input 1 of gate 520 via inverter 517, the A7 output of the UART applies a high to input 3 of gate 520 via primary/secondary straps 536 and the DR output of the UART applies a high to input 4 of gate 520. Input 2 of gate 520 is also high at this time as will be detailed hereinafter. In response thereto, gate 520 transmits a strobe pulse via line 224 to the CLOCK inputs of flip-flops 609-612 thereby gating the 4 bits of the remote terminal address into the flip-flops. The function performed by the address bits will be detailed hereinafter.

The DR output of UART 513 is also applied to one input of gate 512. The output of gate 510 is at this time low (flip-flops 504 and 505 are set) so that the remaining input of gate 512 is low. Therefore, when the DR output of UART 513 goes high, the output of gate 512 goes high, which clears counter 509 causing its Q output to go low. This action disables gate 503 which prevents additional serial data from entering UART 513. This blinds control logic 202 which will remain blinded until there is an absence of signals on the signaling path between the central station and the remote terminal for at least $t_2$ seconds. The manner of unblinding the control logic will be detailed hereinafter.

The DR output of UART 513 also applies a high to the clear input of counter 530. This causes the Q output of counter 530 to go low which applies a low to one input of gate 532 and also enables gate 529. Enabling gate 529 allows clock 502 to begin clocking counter 530. As described above, counter 530 determines the duration of interval $t_3$ which is used to detect extended transmission sequences from the central station at the remote terminal. The consequences of counter 530 completing its count and signaling on extended transmission sequence will be detailed hereinafter.

The DR output of UART 513 also applies a high to input 3 of gate 519. Input 2 of gate 519 is also high due to the A7 output of UART 513 being high which is applied to input 2 of gate 519 via inverters 514 and 528. Input 1 of gate 519 is low due to the PE output of UART 513 being low which is applied to input 1 of gate 519 via inverters 517 and 531. The output of gate 519 is therefore low and the output of inverter 521 is high which applies a high to one input of gate 522 and to the inverted SET input of flip-flop 524.

The DR output of UART 513 also applies a high to the remaining input of gate 522. The output of gate 522 goes high and applies a high to the input of inverter 523 which in turn applies a low to the inverted CLEAR input of flip-flop 524. The high applied to the inverted SET input of flip-flop 524 and the low applied to the inverted CLEAR input places flip-flop 524 in the CLEAR position which in turn, applies a low to one input of gate 532. As the remaining input of gate 532 is low, as described above, the output of gate 532 remains low, thereby preventing the generation of an idle pulse. The conditions necessary to generate an idle pulse will be described hereinafter.

The DR output of UART 513 also applies a high to the D input of flip-flop 525. This flip-flop is then SET with the next clock pulse from clock 502. This in turn applies a high to the DRR input of UART 513 via inverter 541. Applying a high to the DRR input of UART 513 initializes the UART for subsequent addresses causing the DR output to go low while maintaining outputs A1-A7 in their present state. The DR output applies a low to the D input of flip-flop 525 which will cause the flip-flop to be placed back in the CLEAR state with the occurrence of the subsequent clock pulse.

Before proceeding to a detailed description of FIG. 6, a brief summary of the main functions of FIG. 5 will be given. Incoming remote terminal addresses are applied to the RI input of UART 513. The parity of the remote terminal address is checked and the address is applied in parallel to the A1-A7 outputs of UART 513. The four most significant bits of the address are applied via line 225 to the D inputs of flip-flops 609-612 in FIG. 6. Simultaneous therewith a strobe pulse is generated by the DR output of UART 513 and applied via gate 520 and line 224 to the CLOCK inputs of flip-flops 609-612. The DR output of UART 513 also clears counter 509 which in turn disables gate 503. This blinds the multipoint switch and the switch will remain blinded until there is an absence of signals on the signaling path for an interval of at least $t_2$ seconds.

Refer to FIG. 6. The strobe pulse applied to line 224 is a negative going pulse and the leading negative transition of the strobe pulse inverted by inverter 608 gates bit 4 of the address into flip-flop 612 and the lagging positive transition of the strobe pulse gates the first three bits of the address into flip-flops 609-611. Bit 4 functions to select either integrated switch 624 or integrated switch 625. If bit 4 is a logical 1, the Q output of flip-flop 612 applies a high to one input of gate 622 and the $\overline{Q}$ output applies a low to one input of gate 621. Therefore, the output of gate 622 applies a low to the INH input of integrated switch 625 and gate 621 applies a high to the INH input of integrated switch 624. A high applied to the INH input of either integrated switch inhibits operation of that switch until the high is removed. Therefore, when bit 4 is a logical 1, integrated switch 625 is selected (i.e., not inhibited) and when bit 4 is a logical 0, integrated switch 624 is selected.

After selection of the integrated switch, bits 1-3 are gated into flip-flop 609-611, and in turn, applied to the A-C inputs of both integrated switches. The integrated switch that has been selected by bit 4 then completes a signaling path between input terminal 200 and one of output terminals 204-211 or 212-219, defined by the first 3 bits of the remote terminal address. Once the signaling path is completed, the connection will be maintained until a new address is presented, or until the integrated switches are placed in the idle state. The manner of placing the integrated switches in the idle state will be detailed hereinafter.

Recall from the preceding discussion that subsequent to the remote terminal address there is an interval of FSK marking tone, followed by a silent interval of $t_1$ seconds in which there is an absence of signals. The multipoint switch detects the absence of signals and will unblind itself when there is an absence of signals for an interval of $t_2$ seconds ($t_2<t_1$). As described above, the interval of $t_2$ seconds is determined by counter 509 and is defined as the time required to advance counter 509 to a count of 160 at a clock rate of 9600 Hz. The manner in which this is done will now be described in detail.

Following the last interval of marking tone, the silent interval begins. Assuming no response from the selected remote terminal (a remote terminal response will be detailed hereinafter) the start of the silent interval is signaled by the loss of carrier on the signaling path. This is detected by FSK data set 201 which in turn applies a low to terminal 500 in FIG. 5. The low on terminal 500 is applied to one input of gate 503 (this gate is disabled by the Q output of counter 509), to the D input of flip-flop 504 and to one inverted input of gate 506. Flip-flop 504 is cleared by the next clock pulse, applying a low to the D input of flip-flop 505 and a low to one inverted input of gate 510. Flip-flop 505 is at this time in the SET state. This applies a low to the remaining inverted input of gate 510, enabling this gate which applies a high to gate 512, which in turn, clears counter 509. Flip-flop 505 is cleared by the next clock pulse. The Q output of counter 509 applies a low to the remaining inverted input of gate 506 thereby enabling the gate and allowing clock 502 to begin clocking counter 509. Counter 509 will be advanced until it reaches the count of 160, at which time the Q output will go high, disabling gate 506 and enabling gate 503. Enabling gate 503 unblinds the multipoint switch and prepares it to accept subsequent remote terminal addresses.

As described above, the multipoint switch is designed to detect two error conditions, a parity error in a remote terminal address and extended continuous transmission sequences from either the central station or a remote terminal. The result of either error condition is to place the multipoint switch in the idle state. This will now be described in detail.

Refer to FIG. 5. The existence of a parity error in the remote terminal address causes the PE output of UART 513 to go high. This applies a low via inverter 517 to input 1 of gate 520 disabling this gate, and preventing the generation of the strobe pulse. Therefore, an address with a parity error is not applied to integrated switches 624 and 625. A high is also applied to input 1 of gate 519 via inverters 517 and 531. The A7 output of UART 513 is high (primary switch) which applies a high to input 2 of gate 519. Input 3 of gates 519 goes high via gate 526 when the DR lead of UART 513 goes high, thereby enabling gate 519. A low is therefore applied via inverter 521 to one input of gate 522 (disabling this gate) and to the inverted SET input of flip-flop 524. Disabling gate 522 applies a high to the inverted CLEAR input of flip-flop 524 via inverter 523 which in conjunction with the low of the inverted SET input results in placing the flip-flop in the SET state. This applies a high to one input of gate 532. The remaining input to gate 532 is low as counter 530 has been cleared, as described above. Therefore, the output of gate 532 goes low, which applies a low via line 223 to one input of gates 621 and 622. The outputs of both gates then go high which inhibits both integrated switch 624 and integrated switch 625. This places the multipoint switch in the idle state thereby breaking the signaling path between the central station and all remote terminals or other multipoint switches.

To remove the multipoint switch from the idle state it is necessary to receive a subsequent remote terminal address with correct parity. When this occurs, the output of gate 519 will be low and both inputs of gate 522 will be high. This applies a high to the inverted SET input and a low to the inverted CLEAR input of flip-flop 524, clearing this flip-flop and removing the high from the input to gate 532. This in turn removes the low from line 223 thereby removing the multipoint switch from the idle state.

The remaining error condition detected by the multipoint switch is extended continuous transmission sequences from either the central station or a remote terminal. The detection of this error condition is accomplished by counter 530. Recall that counter 530 functions to determine the duration of interval $t_3$, which is defined as an interval of time which exceeds any transmission sequence from either the central station or a remote terminal and is equal to the time required to advance counter 530 to a count of 16,384 at a clock rate of 9600 Hz.

Counter 530 is cleared and begins a new count cycle each time the DR output of UART 513 goes high. Therefore, under normal conditions counter 530 will be cleared each time a polling sequence is transmitted from the central station. Under these conditions, counter 530 will never be allowed to complete its count cycle before it is cleared and begins a new count cycle.

Assume now, however, that the central station or a remote terminal becomes locked in the transmit mode and begins continuously sending data over the signaling path. At the commencement of the polling sequence, counter 530 will be cleared and begins counting. Also at this time, the multipoint switch will blind itself as previously described and remain blinded until there is an absence of signals on the signaling path for an interval of $t_2$ seconds. Now, however, there will not be an absence of signals and the switch will remain blinded. Therefore, no new data will be processed by UART 513 and consequently the DR output of UART 513 will not return high to clear counter 530. Therefore, counter 530 will complete its count cycle, its Q output will go high applying a high to one input of gate 532 and to one input of gate 529, disabling this gate and preventing counter 530 from being advanced further. Applying a high to one input of gate 532 in turn applies a low to line 223 (as flip-flop 524 is cleared and the remaining input of gate 532 is low) thereby placing the multipoint switch in the idle state as described above. The multipoint switch will be removed from the idle state when a new polling sequence is received, thereby again clearing counter 530.

The multipoint switch performs one additional function in conjunction with a reply message sent from the central station to the remote terminal. Three possible reply messages can be transmitted from the central station to the remote terminal as will be detailed hereinafter. Two of these three possible reply messages are always preceded by a remote terminal address. In response thereto, the multipoint switch completes a signaling path between the central station and the addressed remote terminal and thereafter blinds itself as described above. The multipoint switch therefore ignores all message characters following the remote terminal address.

The remaining reply message is designated as the "retry" reply and is used when the central station has detected an error in a response from a remote terminal and is requesting that the remote terminal retransmit the last message. As the error could have occurred in the message control characters from the remote terminal which identify the source of the message, the central station is unable to generate a remote terminal address that is guaranteed to be correct. Therefore, the central station does not precede this reply with an address but merely transmits the reply at the end of the remote terminal message. As the multipoint switch will still be maintaining its last completed signaling path, the reply will automatically be transmitted to the remote terminal from which the erroneous message originated.

A problem with this method is the possibility that the central station, for one reason or another, will be unable to transmit the reply to the remote terminal within $t_2$ seconds from the end of the remote terminal message. Therefore the multipoint switch will unblind itself (in $t_2$ seconds) as described above and when the central station transmits the "retry" reply, the multipoint switch will respond thereto as if the "retry" reply was a new remote terminal address.

To prevent this the multipoint switch includes gates 515, 516 and 518 (FIG. 5) which form a detector for the character SOH. As will be detailed hereinafter, all replies sent from the central station to the remote terminals are preceded by the character SOH. Therefore, if the "retry" reply is sent to the remote terminal when the multipoint switch is unblinded, the first character seen by the multipoint switch is SOH.

This character will be processed by UART 513 (FIG. 5) as described above and presented to the A1-A6 outputs of the UART. The character is detected by gates 515, 516 and 518 and in response thereto the output of gate 518 goes low, disabling gate 520. Disabling gate 520 prevents the generation of the strobe pulse on line 224 and therefore prevents the bits present on line 225 from being gated into flip-flops 609-612 (FIG. 6). Therefore, integrated switches 624 and 625 remain in their previous state and the multipoint switch continues to maintain the previously established signaling path, allowing the "retry" reply to reach the correct remote terminal.

2.2 Secondary Switch Operation

The previous description has been directed toward multipoint switch 107 which is the primary switch in a tandem switch arrangement. The difference between a primary switch and a secondary switch will now be discussed.

As previously described, when a remote terminal is accessed via a tandem switch arrangement, the central station transmits two successive polling sequences. The first polling sequence is as described above and contains the address of the secondary switch. The second polling sequence follows immediately thereafter (i.e., no silent interval) and consists of a remote terminal address followed by an interval of FSK marking tone. The first address is decoded by the primary switch and in response thereto the primary switch completes a signaling path between the central station and the secondary switch. The primary switch then blinds itself as previously described. The secondary switch receives, therefore, the address of the selected remote terminal.

The secondary switch is identical to the primary switch except for the arrangement of the primary/secondary straps. Refer to FIG. 5. For a secondary switch, primary/secondary strap terminal E3 is connected to E4 and terminal E6 is connected to E7. Also for a secondary switch, bit 7 of the remote terminal address is a logical 0. Connecting terminal E3 to terminal E4 places inverter 514 in the output line of the A7 output of UART 513, i.e., inverts bit 7. However, as bit 7 is now a logical 0, the incorporation of inverter 514 results in identical operation of the functions performed by bit 7 as described above. Connecting terminal E6 to E7 places a permanent high on input 2 of gate 519 via inverter 528. In a primary switch a high is also placed on input 2 of gate 519 as the primary/secondary bit is high and is applied to input 2 via inverter 514 and 518. Therefore, the operation of the secondary switch remains the same as described above for the primary switch.

The secondary switch responds to the remote terminal address by extending the signaling path to the remote terminal. Subsequent to the completion of communication between the central station and the remote terminal, both the primary and secondary switches unblind themselves as described above.

The central station may desire to poll all remote terminals connected to a secondary switch before readdressing the primary switch. If this is the case, the central station will again transmit single polling sequence wherein bit 7 of the remote terminal address is a logical 0. The primary switch which has the primary/secondary straps arranged as is shown in FIG. 5 will not change position in response to this address as a logical 0 on the A7 output of UART 513 disables gate 520 thereby preventing the generation of a "strobe" pulse as described above. The secondary switch will respond to the address and connect the addressed remote terminal to the central station. This process will continue until all the remote terminals connected to the secondary switch have been polled.

3.0 Remote Terminal Description

3.1 General Operation

Figure 3:
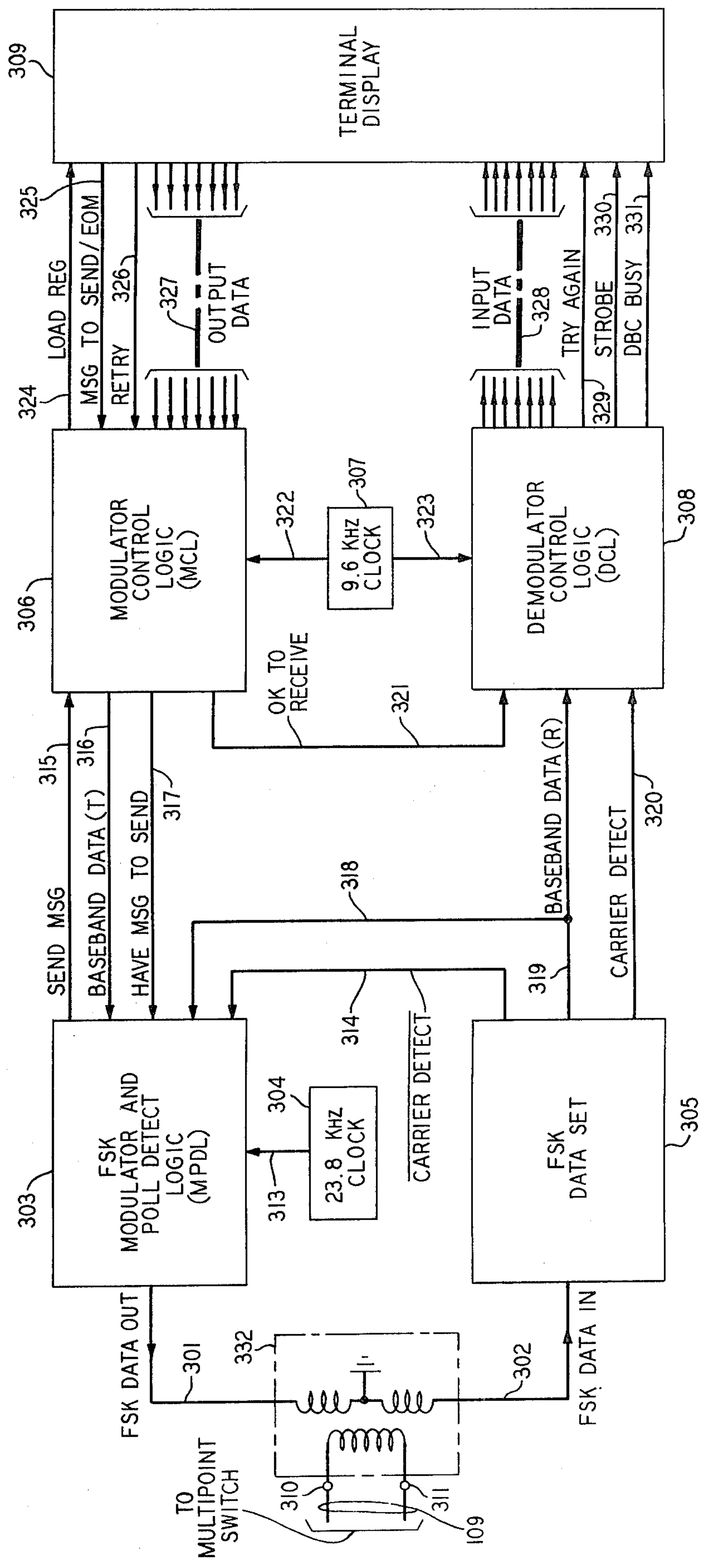
FIG. 3 discloses, in block form, a remote terminal utilized in the multipoint data communications system.

Refer to FIG. 3. Therein is shown a block diagram of a remote terminal such as remote terminal 112, 113 or 115 in FIG. 1. The following discussion will be directed towards terminal 112 but will also apply to any remote terminal as all remote terminals are identical.

Two-wire signaling path 109 (FIG. 1) is connected to line terminals 310 and 311 of line transformer 332 (FIG. 3) Incoming FSK signals are coupled through the line transformer and applied via line 302 to FSK data set 305. Outgoing FSK signals are applied to the line transformer via line 301 and coupled through the line transformer to signaling path 109. FSK data set 305 is a commercially available FSK data set and could, for example, be Bell System Data Set 202, or its equivalent. It functions to detect incoming FSK signals and decode the FSK signals into baseband serial data. Carrier detect signals and the baseband serial data are applied via lines 314 and 318 to Modulator and Poll Detect Logic (MPDL) 303 and via lines 319 and 320 to Demodulator Control Logic (DCL) 308.

DCL 308 accepts the baseband serial data and processes it for use by terminal display 309. The details of DCL 308 will be detailed hereinafter.

Terminal display 309 can be any suitable means for displaying information from the central station and for accepting information from an operator for transmission to the central station. Terminal display 309 advantageously performs the following functions:

1. Decode and display an incoming data word;
2. Notify an operator of certain system conditions such as retransmit previously transmitted data, or data base busy, in response to a control signal applied to the terminal display;
3. Assemble and store a data message for subsequent transmission;
4. Output a data message in response to a control signal applied to the terminal display;
5. Generate a control signal each time it is desired to send a message, and at the end of each message; and
6. Generate a control signal each time an outgoing message is repeated.

Terminal displays performing such functions are well known. For example, terminal displays performing the aforementioned functions are shown in U.S. Pat. No. 3,576,539, granted to G. H. Huber et al. on Apr. 27, 1971, and U.S. Pat. No. 3,815,093, granted to H. L. Caretto et al. on Jun. 4, 1974. As the details of such terminal displays would be obvious to one skilled in the terminal display art, and since terminal display 309 is not part of the invention described herein, no additional details of terminal display 309 will be described.

Modulator Control Logic (MCL) 306 accepts parallel baseband data from terminal display 309 and transfers it in serial to MPDL 303. MPDL 303 in turn converts the serial baseband data into FSK signals and transmits the FSK signals to the central station. The details of MCL 306 and MPDL 303 will be described hereinafter.

Clock 304 is a 23.8 kHz free-running clock and clock 307 is a 9.6 kHz free-running clock.

A remote terminal has 3 modes of operation: a no-traffic mode, a message-to-send mode, and a reply mode.

The no-traffic mode of operation occurs when the remote terminal has no messages to send to the central station and is not expecting a reply from the central station. In this mode of operation, the remote terminal ignores all messages from the central station. Thus an improperly addressed message (due to transmission errors) from the central station will not be processed by the remote terminal. In this mode of operation, the remote terminal continues to be polled from the central station but will not respond to the polling signal.

The message-to-send mode of operation occurs when an operator wishes to send a message to the central station. When an operator stores a message in terminal display 309, a "msg to send" signal is transmitted to MCL 306 via line 325. This informs the MCL that a message is stored and that it can be transmitted to the central station during the next polling sequence. In response to the "msg to send" signal on lead 325, MCL 306 produces a "have msg to send" signal on lead 317 which notifies MPDL 303 that a message is ready to be transmitted. When the next valid poll is detected (in a manner to be detailed hereinafter) MPDL 303 turns on an FSK carrier signal which is applied to the signaling path via line 301 and line transformer 332. At this same time, MPDL 303 applies a "send msg" signal to MCL 306 via line 315. This notifies MCL 306 that a message can now be sent. MCL 306 waits 5 ms (for the FSK carrier to charge the signaling path) and then applies a "load reg" signal to terminal display 309 via line 324. This notifies the terminal display to transfer one 7-bit word of the message. The 7-bit parallel word is transferred via line 327, converted to serial form by MCL 306 and transferred in serial form to MPDL 303 via line 316. MPDL 303 converts the serial baseband data to FSK signals and applies them to the signaling path via line 301 and line transformer 332. This process continues until the last word of the message is outputted by terminal display 309. Coincident with the last word of the message, an "EOM" (end of message) signal is applied by the terminal display via line 325 to MCL 306. In response thereto MCL 306 transmits one additional character (as will be detailed hereinafter) and then removes the "have msg to send" signal from line 317 which causes MPDL 303 to turn off carrier. At this same time, "OK to receive" signal is gated to DCL 308 via lead 321 enabling the DCL so that it can now accept a valid reply message from the central station.

The reply mode of operation follows the message-to-send mode and occurs when the terminal is expecting a reply message from the central station. This mode of operation cannot be entered unless the remote terminal has previously sent a message to the central station. As described above, DCL 308 is enabled by an "OK to receive" signal on lead 321 and begins examining incoming serial baseband data on lead 319 each time carrier is detected by data set 305. As described above, a remote terminal receives the address of the next remote terminal in the poll cycle as well as replies from the central station. To distinguish between the address of the next terminal and a valid reply from the central station, DCL 308 looks for character SOH (start of header) which begins all reply messages. If SOH is not detected, DCL 308 remains blinded as previously described thereby preventing a response to the address of the next terminal.

Detection of character SOH indicates that one of three possible replies is arriving from the central station. The three possible replies are a normal reply message, a "retry" command and a "data base unavailable" reply. The manner in which the three replies are distinguished from each other will be detailed hereinafter. If a normal reply message is received, it is processed by DCL 308, parity is checked and the message is transferred character by character to terminal display 309. If a parity error is detected in any character of the normal reply message a "try again" signal is passed to terminal display 309 indicating that the previous message must be retransmitted to the central station. If a "retry" command is received from the central station, a "try again" signal is passed to terminal display 309 via lead 329 indicating that the previous message must be retransmitted to the central station. If a "data base unavailable" reply is received from the central station, a "DBC busy" signal is passed to terminal display 309 via lead 331 indicating to the operator that the data base is busy and the message should be transmitted at a later time. The remote terminal will now be described in detail.

3.2 Message-to-Send Mode of Operation

Refer to FIG. 3. Recall from what precedes that when the remote terminal has a message to send to the central station, the message is stored in terminal display 309, and a "have msg to send" signal is applied to MPDL 303 via lead 317. The remote terminal then begins looking for the next valid poll from the central station and in response thereto will transmit its message to the central station.

Polling signals from the central station are applied to line terminals 310 and 311 and applied to FSK data set 305 via line transformer 332 and line 302. FSK data set 305 detects the presence of carrier and in response thereto applies a low to carrier detect line 314 and a high to carrier detect line 320. FSK data set 305 also decodes the received FSK polling signal and applies the baseband signal derived therefrom to lines 319 and 318. As a remote terminal poll consists of constant marking tone followed by a silent interval, the baseband signal derived therefrom consists of a constant high for the interval of marking tone and for the silent interval.

Figure 7:
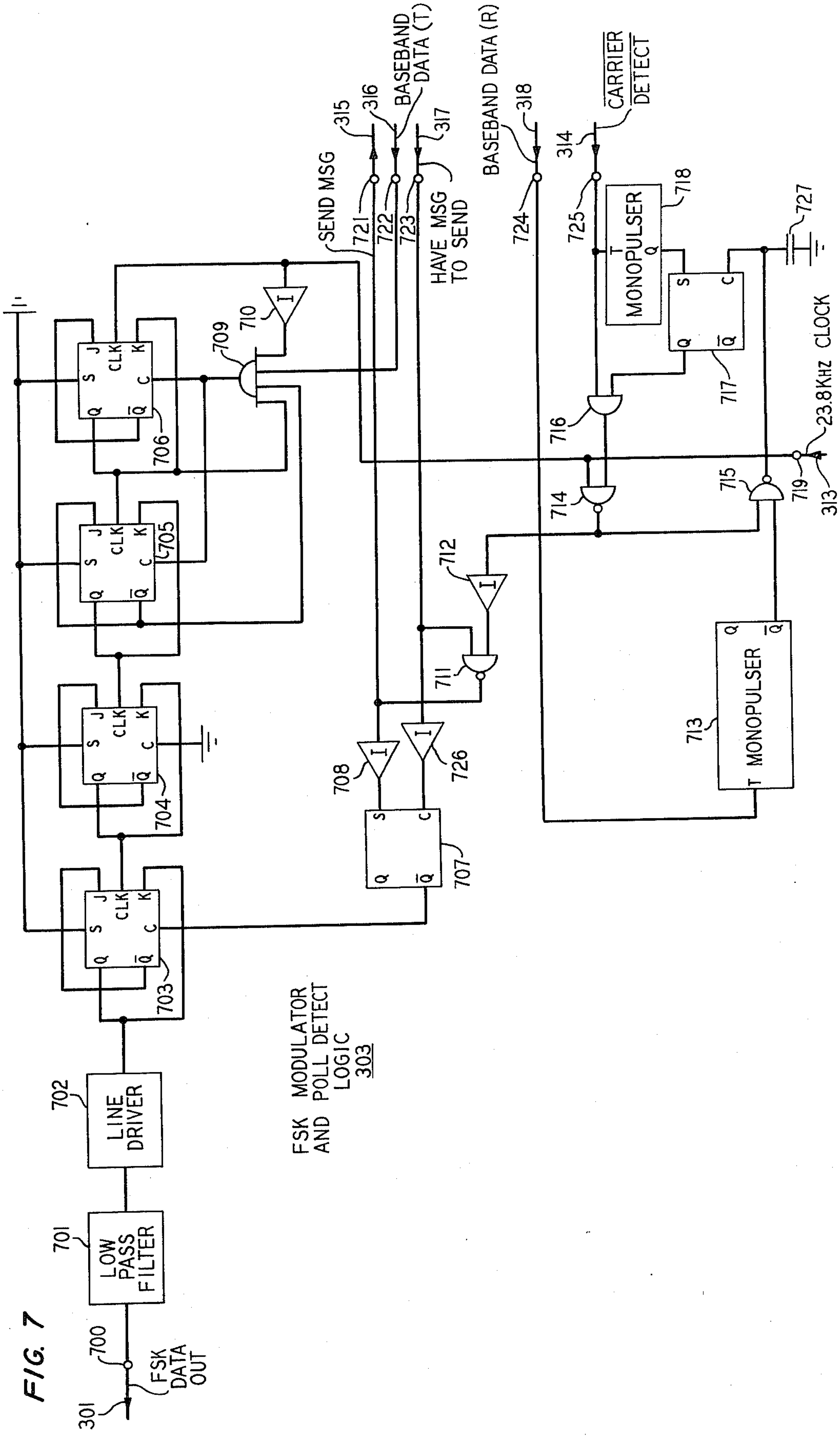
FIG. 7 discloses, in schematic form, a remote terminal's FSK modulator and poll detect logic.

Refer to FIG. 7. Therein is shown the details of FSK modulator and poll detect logic 303. The FSK modulator consists of gates 709, inverter 710, flip-flops 703-706, line driver 702 and low pass filter 701. The FSK modulator serves to convert the serial data messages received from terminal display 309 via MCL 306 and input terminal 722 into FSK signals for transmission to the central station.

Flip-flops 703-706 form a countdown divider chaim which is driven by the 23.8 kHz clock signal appearing on input terminal 719 and applied to the clock input of flip-flop 706. The integer of division of the divider chain is changed according to the logical value (logical 1 or logical 0) of the serial data appearing on input terminal 722.

The serial data appearing on input terminal 722 is applied to one input of gate 709. Gate 709, in conjunction with inverter 710, provides a reset pulse for flip-flop 705 and 706 and if the serial data on input terminal 722 has a value equal to a logical 1. When a reset pulse is produced, it causes the divider chain to divide the 23.8 kHz clock signal by 12 thereby providing at the Q output of flip-flop 703 a frequency of 1983 Hz which is equal to FSK spacing tone. When the serial data on input terminal 722 is equal to a logical 0, no reset pulse is produced and the divider chain divides by 16, producing a frequency of 1483 Hz which is the FSK marking tone.

The FSK modulator is normally disabled by clamping the output of flip-flop 703 in the CLEAR state. This is done by normally reset flip-flop 707 which applies a high to the CLEAR input of flip-flop 703, disabling this flip-flop. When a message is to be transmitted, flip-flop 707 is SET (in a manner to be detailed hereinafter) thereby unclamping flip-flop 703 and allowing the marking and spacing tones to be applied to line driver 702, and in turn to low pass filter 701. The line driver amplifies the output of the divider chain and applies the marking and spacing tones to the low pass filter. The low pass filter limits the out-of-band components of the square wave output of the divider chain to thereby create the FSK sinusoidal marking and spacing tones which are applied to output terminal 700 and line 301 for transmission to the central station.

The poll detect circuitry consists of the remaining logic shown in FIG. 7. It functions to recognize a valid polling signal from the central station and to ignore all signals on the signaling path which are not polling signals.

As described above. FSK data set 305 detects incoming FSK polling signals. In response to the detection of carrier, a low is applied to MPDL input terminal 725 via line 314 and the baseband signals decoded from the FSK polling signals (a high for the interval of FSK marking tone and for the silent interval) arer applied to input terminal 724. The low on input terminal 725 applies a low to one input of gate 716, thereby disabling this gate, and also toggles monopulser 718, applying a pulse to the SET input of flip-flop 717 which sets this flip-flop. The Q output of flip-flop 717 then applies a high to the remaining input of gate 716. The high applied to input terminal 724 is presented to the toggle input of monopulser 713. As monopulser 713 only responds to negative signal transistors, it does not respond to the high applied to its toggle input.

At the conclusion of the FSK marking tone interval, the silent interval begins (indicating a valid polling sequence) causing a loss of carrier which results in input terminal 725 returning high.

Input terminal 725 going high, enables gate 716 (as flip-flop 717 is still SET) thereby applying a high to one input of gate 714. The remaining input of gate 714 goes high with the next positive transition of the clock signal on input terminal 719. The output of gate 714 then applies a low to one input of gate 715 and to the input of inverter 712, which in turn, applies a high to one input of gate 711. The remaining input of gate 711 is high as input terminal 723 is high (it is assumed there is a message to send) so the output of gate 711 applies a low to output terminal 721 and a high to the SET input of flip-flop 707 via inverter 708. The CLEAR input of flip-flop 707 is low due to the high on input terminal 723 applied thereto via inverter 726. Therefore the high on the SET input sets flip-flop 707 which, in turn, applies a low to the CLEAR input of flip-flop 703, thereby unclamping this flip-flop and enabling the modulator divider chain.

The $\overline{Q}$ output of monopulser 713 is normally high. Therefore the low applied to one input of gate 715 from gate 714 causes the output of gate 715 to go high. This high which is delayed by capacitor 727 then clears flip-flop 717 causing its Q output to go low. This disables gate 716 which in turn causes the output of gate 714 to go high, applying a low to one input of gate 711 via inverter 712. The output of gate 711 then goes high, applying a high to output terminal 721 (which has no effect as will be detailed hereinafter) and a low to the SET input of flip-flop 707 via inverter 708.

The low applied to output terminal 721 by gate 711 is applied to MCL 306 via line 315 and signals MCL 306 (FIG. 3) that the message stored in terminal display 309 can now be transmitted to the central station.

In response thereto, MCL 306 signals terminal display 309 via line 324 (in a manner to be detailed hereinafter) and the message is transferred word by word via line 327 to MCL 306. MCL 306 performs a parallel-to-serial conversion plus other functions to be described later and applies the serial baseband data to input terminal 722 of MPDL 303 via line 316. The serial baseband data is applied to gate 709 of the FSK modulator. In response thereto, an FSK signal is generated as described above and applied to output terminal 700.

The preceding description of the FSK modulator and poll detect logic assumed that the terminal had a message to send to the central station and that a valid poll was received from the central station. The consequences of a valid poll with no message to send and an invalid poll will now be described.

If the terminal does not have a message to send to the central station, input terminal 723 will be low. Therefore, gate 711 will not be enabled when a valid poll is detected as described above, which in turn prevents flip-flop 707 from being set. This in turn causes flip-flop 703 to remain clamped in the CLEAR state, thereby disabling the FSK modulator. Therefore, the terminal will not respond to a valid poll if it does not have a message to send to the central station.

As described above, a terminal will see a next terminal address as well as a valid poll during a normal polling sequence. To the terminal, this will appear as an interval of marking tone, followed by the mark and space tones of the next terminal address, followed by an absence of signals. The absence of signals begins when the multipoint switch decodes the next terminal's address, and completes a signaling path to the next terminal, thereby breaking the signaling path to the terminal now being described.

When the terminal now being described receives the marking tone, flip-flop 717 is set by input terminal 725 going low, as described above. The next terminal address will be decoded by FSK data set 305 and the baseband signal derived therefrom will appear on input terminal 724. As the next terminal address consists of mark and space tones, the baseband signal on input terminal 725 will contain positive and negative voltage transitions. The first negative voltage transition will toggle monopulser 713 causing its $\overline{Q}$ output to go low. This in turn causes the output of gate 715 to go high (as the output of gate 714 is high) which in turn clears flip-flop 717, thereby disabling gate 716. Therefore, when input terminal 725 returns high when the absence of signals occurs, as described above, gate 716 will be disabled and prevent the modulator from being enabled. In this manner, a terminal ignores a next terminal address or any signal other than a valid poll and does not respond thereto.

Figure 8:
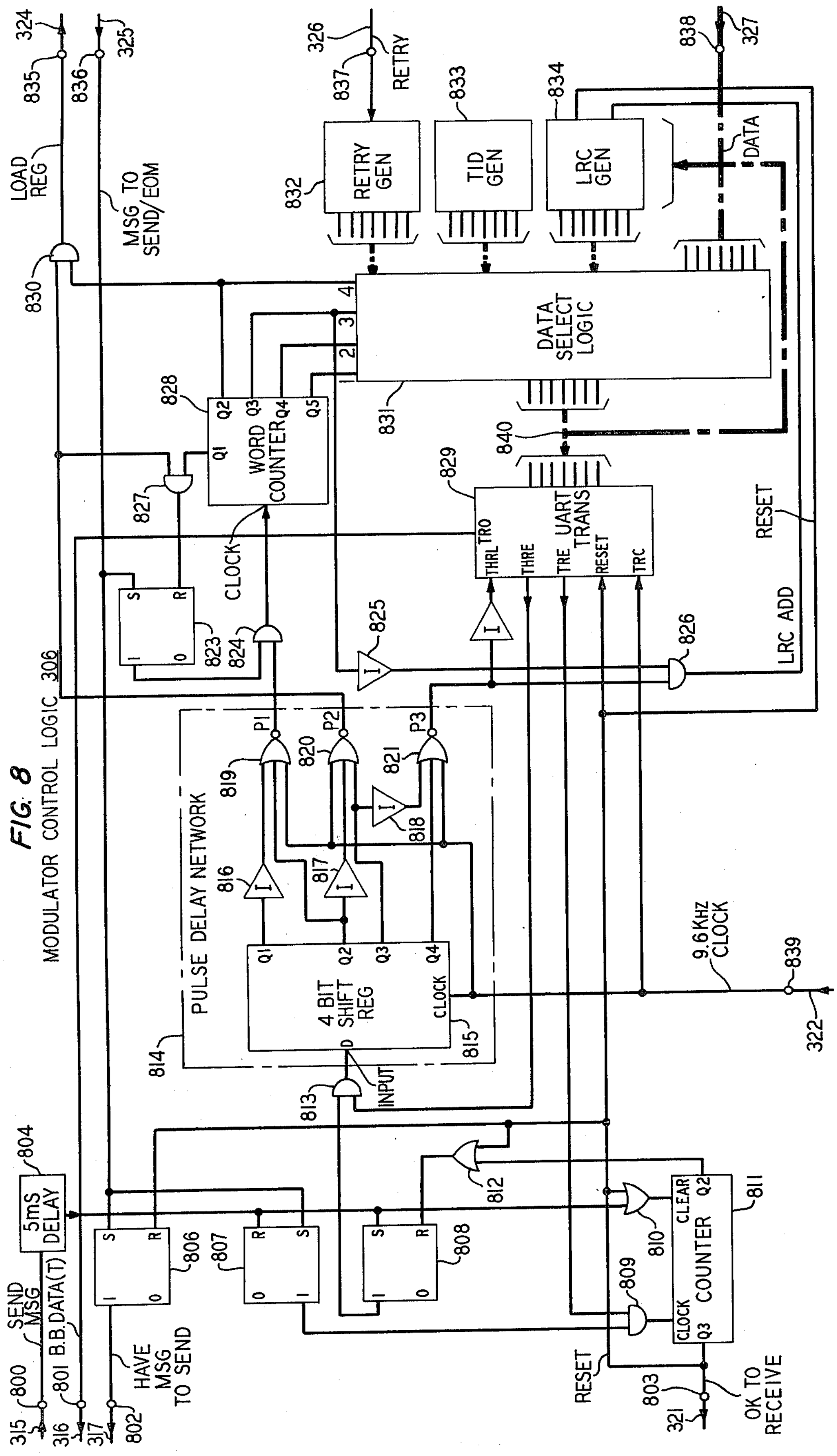
FIG. 8 discloses, in schematic form, a remote terminal's modulator control logic.

Refer to FIG. 8. The details of the modulator control logic 306 will now be described. Input terminal 800 carries the "send message" signal from MPDL 303 via line 315, output terminal 801 carries the baseband serial data to MPDL 303 via line 316, output terminal 802 carries the "have message to send" signal to MPDL 303 via line 317, output terminal 803 carries the "OK to receive" signal to DCL 308 via line 321, output terminal 835 carries the "load register" signal to terminal display 309 via line 324, input terminal 836 carries the "message to send/EOM" signal from terminal display 309 via line 325, input terminal 837 carries the "retry" signal from terminal display 309 via line 326 and input terminal 838 carries the parallel baseband data from terminal display 309 via line 327.

Delay unit 804 provides a 5 ms delay, and could, for example, be a standard monostable multivibrator.

Counter 811 is a divide-by-3 counter. Upon reaching count 2, output Q2 goes high and remains high until count 3, at which time output Q2 goes low, and output Q3 goes high and remains high until the counter is cleared.

Word counter 828 is a divide-by-6counter with internal logic arranged to provide the following outputs: for counts 1 and 2, output Q2 is high, for count 3 output Q4 is high, for count 4 output Q5 is high, for count 5, output Q1 and output Q2 are high, and for count 6 output Q3 is high. After count 6 the counter begins a new counting cycle.

UART 829 is a commercially available integrated circuit and could, for example, be the transmitter portion of Western Digital Corporation's integrated circuit TR 1402A described in "TR-1402A Asynchronous Receiver/Transmitter Application Report No. 1," dated October 1972, and published by Western Digital Corporation, 19242 Red Hill Avenue, Newport Beach, Cal. 92663. The UART is clocked by the 9.6 kHz signal appearing on input terminal 839 via line 322. A low level applied to input THRL of the UART gates in parallel data appearing on line 840, the UART then adds a parity bit, a start and stop bit, performs a parallel-to-serial conversion, and shifts the 10-bit serial character out of output TRO at one-sixteenth the 9.6 kHz clock signal frequency. Output TRE goes high when the last bit of the entire 10-bit character is being shifted out. Output THRE goes high when the UART is ready to accept a new character. This occurs one and one-half 9.6 kHz clock periods (approximately 0.15 msec) after a data character has been gated into the UART.

Data select logic 831 functions to gate the parallel inputs from retry generator 832, data input terminal 838, TID generator 833 and LRC generator 834 to the UART via line 840. In response to a high on input 1, the retry generator input is gated to line 840, in response to a high on input 2, the TID generator input is gated to line 840, in response to a high on input 3 the LRC generator is gated to line 840 and in response to a high on input 4 the DATA input is gated to line 840. Data select logic 831 is shown in detail in FIG. 8B. As it is combinational logic arranged in a conventional manner, no further details will be given.

Retry generator 832 consists of an arrangement of combinational logic gates designed to produce two 7-bit words. With a low on input terminal 837, the retry generator produces a 7-bit word (1000100) which indicates to the central station that the following data is being transmitted for the first time. With a high on input terminal 837, the retry generator produces a second 7-bit word (0100100) that indicates to the central station that the following data is being transmitted for at least the second time. As the combinational logic necessary to produce the two 7-bit words would be obvious to one skilled in the art, no further details will be given.

TID generator 833 produces a 7-bit word that identifies to the central station the remote terminal from which a message is coming. Each remote terminal in the system has its own unique TID character. Physically, the TID generator consists of seven screw switches. Each screw switch generates 1 bit of the 7-bit TID characters. The screw switches are selectively operated at the time a remote terminal is added to the system thereby identifying that remote terminal to the central station for all subsequent transactions. As such an arrangement of screw switches would be obvious to one skilled in the art, no further details will be given.

Figure 8A:
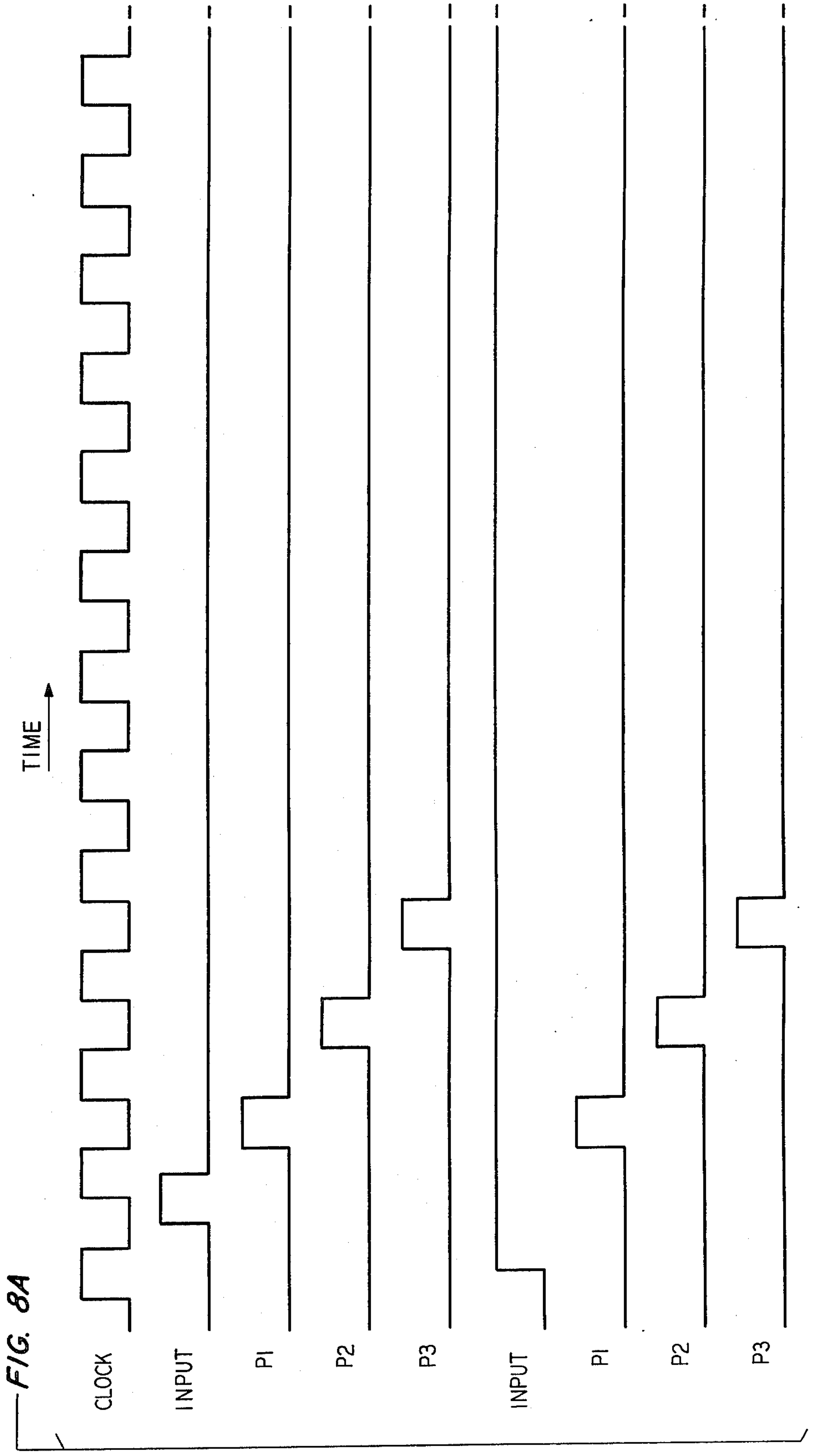
FIG. 8A discloses a timing diagram for the pulse delay network shown in the modulator control logic.
Figure 8B:
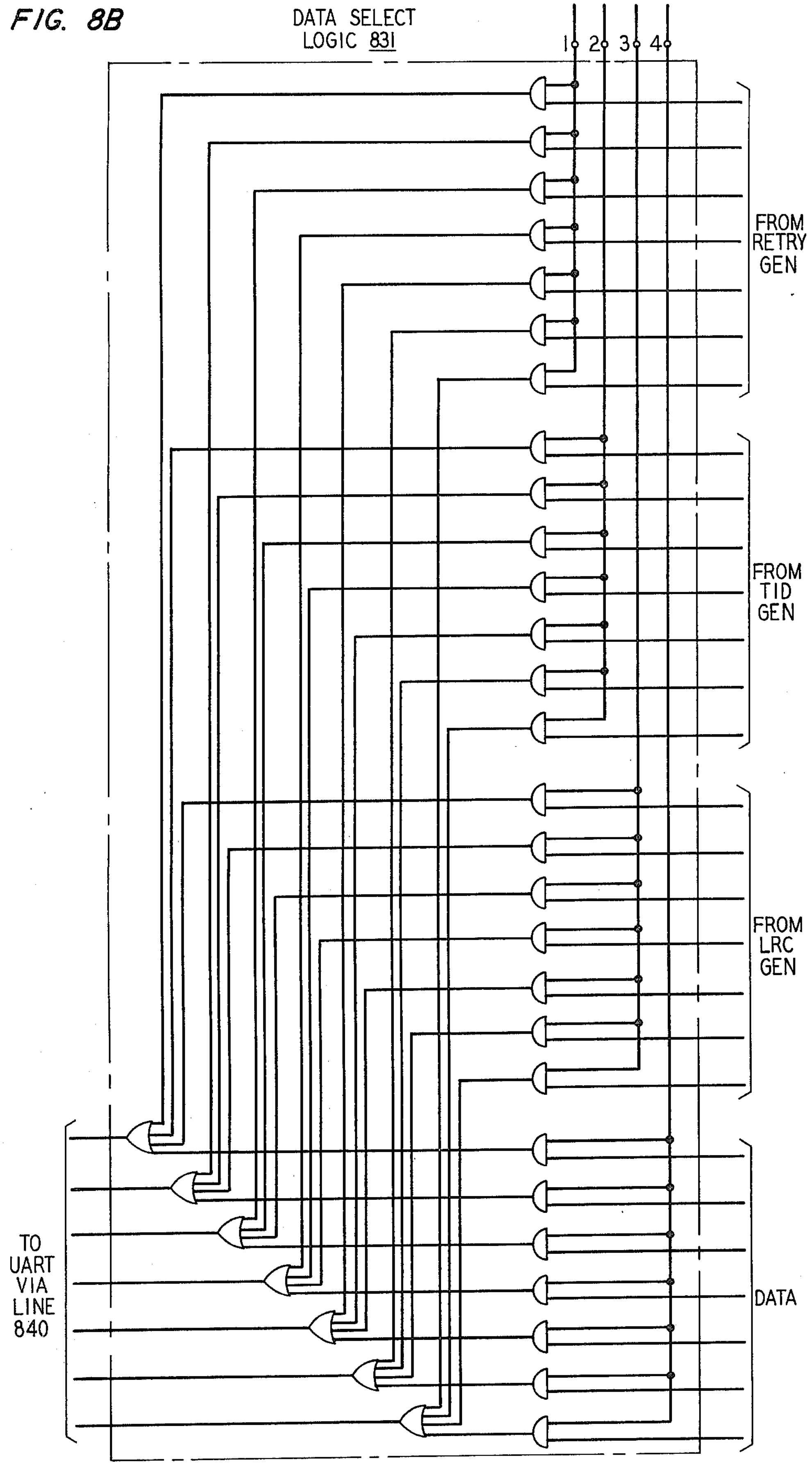
FIG. 8B discloses, in schematic form, the data select logic shown in the modulator control logic.
Figure 8C:
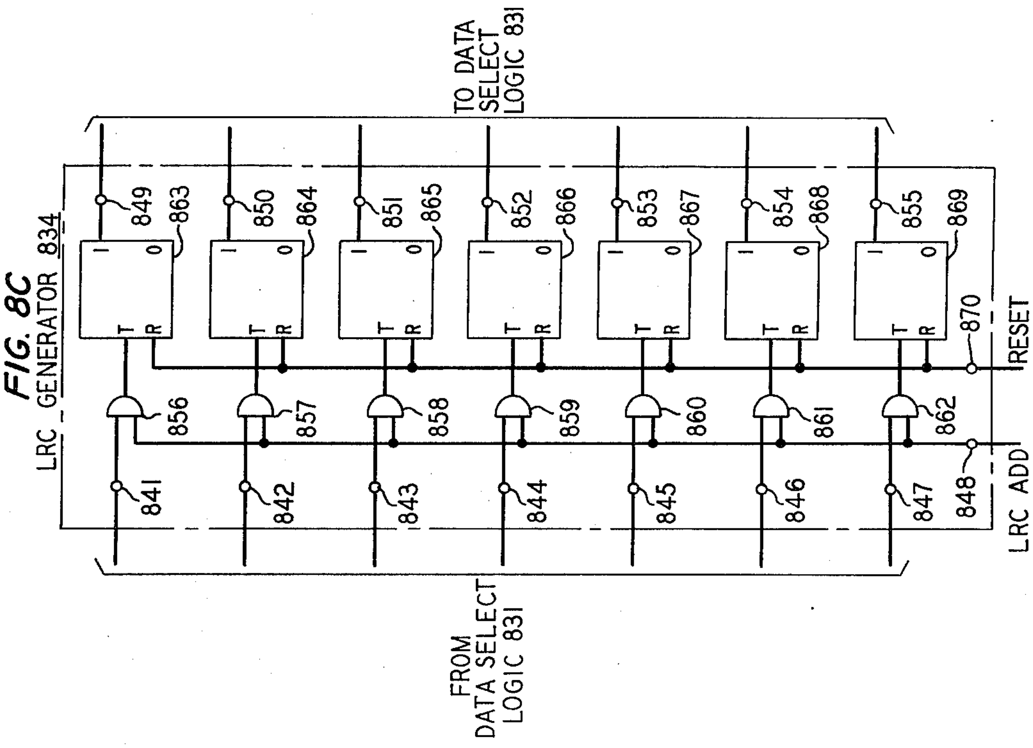
FIG. 8C discloses, in schematic form, the LRC generator shown in the modulator control logic.

LRC generator 834 is comprised of a shift register and an arrangement of combinational logic gates. It functions to produce the character LRC which is the last character in any message transmitted from the remote terminal. Character LRC is a parity character for the entire message and is used by the central station to check message parity. Character LRC is the modulo-2 sum of all the previously transmitted bits in the message. The details of the LRC generator 834 are shown in FIG. 8C and will be described hereinafter.

Pulse delay network 814 functions to produce three pulses, P1, P2 and P3 in response to a positive pulse of sufficient duration applied to the D input of shift register 815. The pulse delay network is driven by the 9.6 kHz clock signal appearing on input terminal 839 and consists of 4-bit shift register 815 and gates 816-821. A timing diagram for the pulse delay network is shown in FIG. 8A. The timing diagram shows that when the input to shift register 815 goes high, just prior to a positive-going clock transition, and remains high until the end of the transition, the outputs P1, P2 and P3 will each be a pulse ½ clock period wide. P1 is delayed with respect to the input of shift register 815 going high by between one half and 1½ clock periods, and P2 and P3 are delayed with respect to P1 by 1 clock period and 2 clock periods, respectively. Two cases are shown in the timing diagram, one in which the input signal is a short pulse, and one in which the input signal is a long pulse. As is shown therein, the outputs P1, P2 and P3 are independent of the length of the input signal as long as the input signal remains high throughout one positive-going clock transition.

The operation of the modulator logic will now be described. Each time a remote terminal transmits a message to the central station, the following 7-bit character sequence is generated:

```
S D T R S                              E L
O B I E T . . .    message text ...    T R
H C D T X                              X C
```

SOH is a start-of-header character and precedes each message from a remote terminal. DBC is a data base character and is generated by terminal display 309. It is utilized by the central station to identify the data base with which the remote terminal wishes to communicate in the event the central station is accessing a plurality of data bases. TID is the remote terminal identification character and is generated in the manner described above. RET is the retry character and is generated in the manner described above. STX is the start-of-text character and is generated by terminal display 309. It is utilized by the central station to determine the beginning of the message text. ETX is the end-of-text character and is generated by terminal display 309. It is utilized by the central station to determine the end of the message text. LRC is the message parity character and is generated as described above. Characters DBC and TID can be any 7-bit characters suitable to the system signaling format. Characters SOH, STX and ETX as well as the message text are American Standard Code For Information Interchange (ASCII) characters. Characters RET and LRC have been described above.

When the remote terminal has a message to transmit to the central station, terminal display 309 applies a positive message-to-send pulse to input terminal 836. The pulse is applied to the SET inputs of flip-flops 823, 806 and 807. In response thereto, these flip-flops are placed in the SET state. The 1 output of flip-flop 806 going high generates a "have message-to-send" signal which is applied to terminal 802 and transferred to MPDL 303 via line 317. As described above, this signal enables the FSK modulator to be turned on after the subsequent valid poll is detected by MPDL 303. The 1 output of flip-flop 807 going high advances counter 811 to the count 1 state via gate 809 which is enabled by the TRE output of UART 829. The 1 output of flip-flop 823 going high enables gate 824.

As described above, after MPDL 303 detects the subsequent valid poll, a "send message" signal is applied to input terminal 800 via line 315 (FIG. 3). The "send message" signal is delayed 5 ms by delay 804. the 5 ms delay is necessary to allow the FSK modulation in MPDL 303 to charge the signaling path to the central station before any data is transmitted. After the 5 ms delay, the "send message" signal sets flip-flop 808 (enabling gate 813), resets flip-flop 807 (disabling gate 809), and clears counter 811 via gate 810. At this time the UART 829 is ready to accept a data character so UART output THRE is high. This applies a high to the input of shift register 815 via enabled gate 813. In response thereto pulse delay network 814 generates pulses P1, P2 and P3 as described above.

Pulse P1 is applied to the CLOCK input of word counter 828 via enabled gate 824 which causes the word counter to advance to count 1, thereby producing a high on the Q2 output as described above. With the Q2 output high, gate 830 is enabled and a high is applied to input 4 of data select logic 831 thereby enabling the data input to the data select logic. Pulse P2 is produced next and generates a "load register" signal which is applied to terminal display 309 via enabled gate 830 and output terminal 835. In response thereto terminal display 309 applies the first character (SOH) to input terminal 838. This character is gated through the data select logic (as the data input is enabled) and applied to the UART 829 via line 840. Pulse P3 occurs next and pulses the UART on input THRL and also pulses one input of gate 826. In response thereto, the UART loads the SOH character, processes it as described above, and shifts out the serial character via output TRO and output terminal 801 to MPDL 303. (After each character is shifted out, UART output TRE goes high. This has no effect at this time because gate 809 is disabled by flip-flop 807.) MPDL 303 in turn converts the character to FSK signals and transmits the character to the central station as described above. At this time, the Q3 output of the word counter is low, which enables gate 826 via inverter 825. Therefore, pulse P3 is also passed through gate 826 and applied to LRC generator 834. As described above, this causes the character to be added modulo-2 to the character last transmitted. (As this is the first character, it is added modulo-2 to logical 0 as will be detailed hereinafter.)

Subsequent to pulse P3 (1½ clock periods) UART 829 output THRE goes high and applies a high to the input of the shift register 815 via enabled gate 813. Pulse delay network 814 again generates pulses P1, P2 and P3. Pulse P1 advances word counter 828 to count 2. Pulse P2 generates another load register signal via enabled gate 830 causing terminal display 309 to output the second character (DBC) to input terminal 838 and through data select logic 831. Pulse P3 causes the second character to be loaded into and processed by the UART after which the serial character is shifted out to MPDL 303 via output terminal 801. Pulse P3 also causes the LRC generator to add the second character to the first character modulo-2 as described above.

UART output THRE again goes high during the start bit of character DBC as described above and in response thereto, the pulse delay network generates three more pulses. Pulse P1 advances the word counter to count 3. In response thereto, word counter output Q4 goes high enabling the TID input of the data select logic, thereby gating the TID character to the UART.

Also, the Q2 output of the word counter goes low, disabling gate 830. Pulse P2 is therefore blocked by disabled gate 830 which prevents the "load register" signal from reaching the terminal display. Pulse P3 gates the TID character into the UART, and the serial character is shifted out. Pulse P3 also causes the LRC generator to add the third character to the second character modulo-2. Subsequent to pulse P3 (during start bit of character TID), the THRE output of the UART returns high, thereby activating pulse delay network 814 via gate 813.

Pulse P1 advances the word counter to count 4, causing the Q5 output of the word counter to go high. In response thereto, the retry character (1st try) is gated to the UART as described above. Pulse P2 has no effect as gates 827 and 830 are disabled. Pulse P3 gates the retry character into the UART, the serial character is shifted out and UART output THRE returns high. Pulse P3 also causes the LRC generator to add the fourth character to the third character modulo-2.

The pulse delay network is again activated by the THRE pulse and the network produces three more pulses. Pulse P1 advances the word counter to count 5 causing the Q1 and Q2 outputs to go high, thereby enabling gate 827, gate 830 and the data input of the data select logic. P2 again generates a "load register" signal via enabled gate 830 and also resets flip-flop 823 via enabled gate 827. Resetting flip-flop 823 disables gate 824 and prevents the word counter from being advanced any further until flip-flop 823 is again set. In response to the "load register" signal terminal display 309 presents the fifth character (STX) to input terminal 838. The character is gated to the UART and in response to pulse P3 the UART processes the character and transmits it to the central station. Pulse P3 also activates the LRC generator as described above. Subsequent to pulse P3 the THRE output of the UART returns high, activating the pulse delay network.

The process just described now continues for the text portion of the terminal message. Characters are continually transferred from the terminal display to the data select logic until the last character (ETX) is applied to the data select gating in response to pulse P2. Coincident with ETX being applied to input terminal 838 (and coincident with the start bit of the previous character being shifted out of the UART but subsequent to pulse P2) an "end-of-message" pulse is applied to input terminal 836. This pulse sets flip-flops 823 (enabling gate 824) and 807 (flip-flop 806 is already set). Pulse P3 then loads ETX into the UART, the UART begins transmission of the character preceding ETX, and pulse P3 activates the LRC generator which adds ETX to the previous character. As the last bit of the character preceding ETX leaves the UART, the TRE output goes high as described above. Since flip-flop 807 is now set gate 809 is enabled and the TRE signal advances counter 811 to count 1. ETX is then transmitted to the central station and during its start bit the THRE output of the UART goes high and again activates the pulse delay network.

Pulse P1 advances the word counter to count 6 via enabled gate 824, causing the Q3 output to go high and the remaining word counter outputs to go low. In response thereto gate 826 is disabled via inverter 825 (preventing the generation of the "LRC add" signal) and the LRC input to the data select gating is enabled. Pulse P2 has no effect as gate 830 is now disabled. Pulse P3 gates the LRC character into the UART. Subsequent to pulse P3, but before pulse THRE, the previous character ETX leaves the UART and in response thereto the TRE output of the UART goes high and advances counter 811 to count 2. The Q2 output of counter 811 goes high and resets flip-flop 808 via gate 812, thereby disabling gate 813 and preventing further activation of the pulse delay network. Therefore, when the THRE output goes high during transmission of LRC, no further pulses will be generated by the pulse delay network. At the end of the LRC character, TRE again goes high advancing counter 811 to count 3. The Q3 output goes high and transmits the "OK to receive" signal to DCL 308 via line 321. The Q3 output going high also resets UART 829, LRC generator 834 and flip-flop 806 in preparation for subsequent transmissions.

Before proceeding to the reply mode of operation, the details of LRC generator 834 will be described. Refer to FIG. 8C. Input terminals 841-847 carry the 7-bit words from the output of data select logic 831. Output terminals 849-855 carry the 7-bit LRC character to the input of the data select logic. Input terminal 848 carries the "LRC add" signal from gate 826 (FIG. 8) and input 870 carries the "Reset" signal from counter 811 (FIG. 8).

As described each character applied to the input of UART 829 (FIG. 8) is also applied to the LRC generator at input terminals 841-847. Thereafter, in response to an LRC add pulse, the 7-bit character is gated through gates 856-862 and applied to the toggle inputs of flip-flops 863-869. If the bits are a logical 1 the respective flip-flops are toggled and if the bits are a logical 0 the flip-flops are not toggled.

Flip-flops 863-869 begin each new transmission in the RESET state due to the reset pulse applied to input terminal 870 at the end of each transmission as described above. Therefore, the first word applied to flip-flops 863-869 is added modulo-2 to the 7-bit word 0000000. Thereafter each word applied to flip-flops 863-869 is added modulo-2 to the previous word stored therein. In this manner, the LRC character, which is the modulo-2 sum of all preceding characters, is generated.

3.3 Reply Mode of Operation

The central station accepts messages from the remote terminal, communicates with the selected data base, determines the origin of the message from the TID character, formulates a reply to the remote terminal and transmits the reply to the remote terminal during the terminal's normal turn in the polling sequence. The format of a reply to the remote terminal is shown in FIG. 4A. As is shown therein, the reply format consists of a normal polling signal (stop bits, address bits, stop bits), immediately followed by the control characters and text of the reply message without an intervening silent interval. The multipoint switch responds to the remote terminal address and establishes a signaling path between the central station and the remote terminal. The remote terminal therefore receives the second interval of stop bits immediately followed by the control characters and text of the reply message.

Three possible replies can be transmitted from the central station to the remote terminal. The character format of the control characters and text of these replies is as follows:

```
1) Normal                 [S T S        ...test...    E L]
                          [O I T                      T R]
                          [H D X                      X C]
2) Retry                  [S N]
                          [O A]
                          [H K]
3) Data base unavailable                [S T U S E L]
                                        [O I N T T R]
                                        [H D A X X C]
```

Reply No. 1 is used when the system is operating normally. Reply No. 2 is used when the central station detects an error in transmission and requests a retransmission of the previously transmitted message. As described above, this reply is not preceded by a remote terminal address and is immediately transmitted to the remote terminal without waiting for that terminal's next turn in the polling sequence. Reply No. 3 is used when the requested data base is unavailable. Each of the three possible replies commence with the control character SOH. This character is used to allow the remote terminal to distinguish between a reply message from the central station and any other signals on the signaling path. The manner in which this is done will be detailed hereinafter. Reply No. 1 and reply No. 3 contain the character TID. This is the remote terminal identification character received at the central station during each remote terminal message sent to the central station. The central station uses this character to identify the source of the message and then includes this character in its response to the remote terminal. Reply No. 3 contains the character UNAV which is used by the central station to indicate that a data base is unavailable. The remaining characters in the three replies have been described above.

Refer to FIG. 9. Therein is shown the details of demodulator control logic 308. Input terminal 900 carries the "OK to receive" signal from the modulator control logic, input terminal 901 carries the serial baseband data which has been decoded by FSK data set 305, input terminal 902 carries the "carrier detect" signal from FSK data set 305, and input terminal 903 carries the clock signal from the 9.6 kHz clock. Output terminal 904 carries the parallel 7-bit data words to the terminal display, output terminal 905 carries the "try again" signal to the terminal display, output terminal 906 carries the "strobe" signal to the terminal display and output terminal 907 carries the "DBC busy" signal to the terminal display.

UART 921 is identical to the UART used in the multipoint switch, i.e., UART 513 in FIG. 5. Its functions have been described above.

Pulse delay network 923 is identical to the pulse delay network used in the modulator control logic, i.e., pulse delay network 814 in FIG. 8. Its functions have been described above.

Word counter 924 is a standard divide-by-4 counter. When the counter is at count 1, the CT1 output is high, at count 2 the CT2 output is high, etc. As such a counter is well known in the art, no further details will be given.

TID generator 929 is identical to the TID generator used in the modulator control logic. Both TID generators are preset to generate the same TID characters as described above.

TID comparator 930 is an arrangement of combinational logic gates used to compare the TID character transmitted from the central station which is supplied to the TID comparator via UART 921 and the TID character from TID generator 929. If the characters are identical it indicates that the reply message has been received at the correct remote terminal and in response thereto the output of the TID comparator goes high. If the characters are not identical, it indicates that an error has occurred during transmission and the output of the TID comparator remains low. As the details of the combinational logic necessary to perform such a comparison would be obvious to one skilled in the art, no further details of TID comparator 930 will be given.

SOH detector 931 is an arrangement of combinational logic gates designed to detect the ASCII character SOH (1000000) applied to the SOH detector via UART 921. When the character SOH is detected, the output of detector 931 goes high. UNAV detector 932 is an arrangement of combinational logic gates designed to detect the character UNAV (1110100 — ASCII character ETB) applied to the UNAV detector via UART 921. When the character UNAV is detected, the output of detector 932 goes high. ETX detector 933 is an arrangement of combinational logic gates designed to detect the ASCII character ETX (1100000) applied to the ETX detector via UART 921. When the character ETX is detected, the output of detector 933 goes high. As the details of detectors 931, 932 and 933 would be obvious to one skilled in the art, no further details will be given.

Figure 9A:
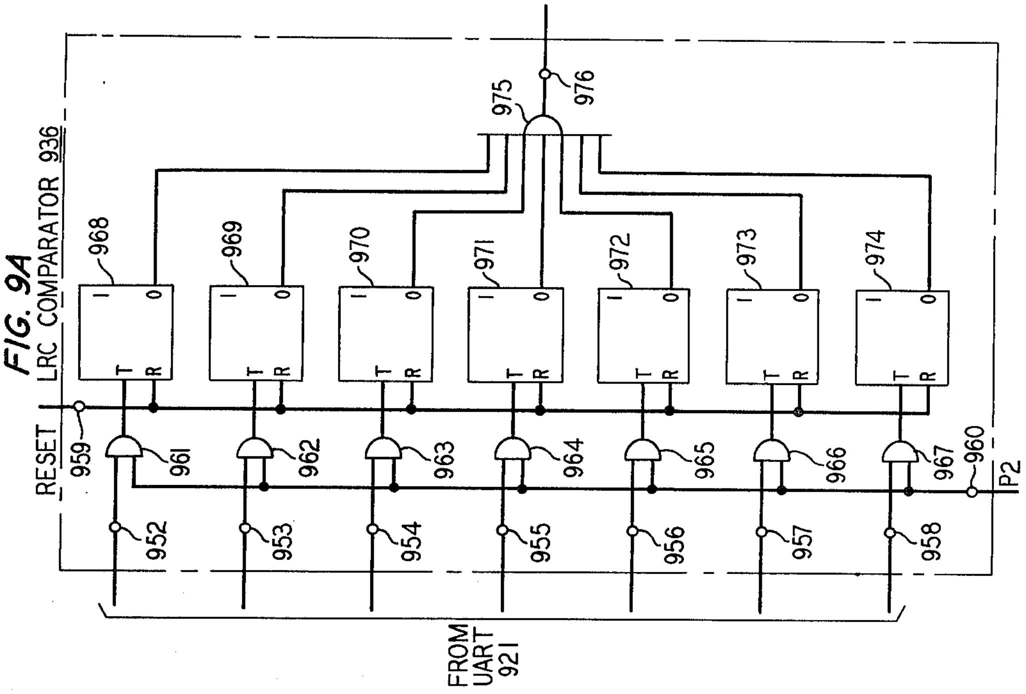
FIG. 9A discloses, in schematic form, the LRC comparator shown in the modulator control logic.

LRC comparator 936 is similar to LRC generator 834 in the modulator control logic. It functions to add each character from the output of UART 921 modulo-2 to the previous characters received. The last character received in a reply message is an LRC character which has been generated by the central station. When this LRC character is added modulo-2 to all previous characters, the sum should be zero if there have been no errors in transmission. When this occurs, the output of LRC comparator 936 goes low. The details of LRC comparator 936 are shown in FIG. 9A and will be datailed hereinafter.

The functions of the demodulator control logic will now be described in detail. Recall from what precedes that the demodulator control logic is normally disabled and is only enabled subsequent to a message sent to the central station with an "OK to receive" signal applied to input terminal 900 by the modulator control logic. The signal sets flip-flop 914, thereby placing a high on one input of gate 916 and sets flip-flop 915, thereby placing a high on one input of gate 918. Placing a high on one input of gate 916 enables the demodulator control logic and prepares it to accept incoming messages from the central station.

When incoming carrier is detected by FSK data set 305 (FIG. 3) a high is applied to input terminal 902 via line 320 and in turn to a second input of gate 916, to the input of inverter 917 and to a second input of gate 918.

The serial baseband data decoded by FSK data set 305 is applied via line 319 and terminal 901 to the input of enabled gate 916 and in turn to the RI input of UART 921. The first stop-to-start transition in the baseband data (i.e., the start of the control characters) activates the UART and the incoming serial character is processed by the UART and appears in parallel on the A1-A7 outputs of the UART. The parallel word is thus applied to detectors 931-933, comparators 930 and 936 and to output terminal 904. At this same time, the DR output of the UART goes high.

The A1-A7 outputs of the UART are applied in parallel to the input of SOH detector 931. If the character is not SOH, indicating that the incoming data is not a reply message, the output of the SOH detector remains low and flip-flop 937 remains in the CLEAR state. This applies a high to one input of gate 926 which clamps the output of gate 926 high. Therefore, when the DR output of the UART goes high, the high applied to the input of gate 926 via gate 925 does not cause a positive transition to be applied to the input of the pulse delay network. Therefore, the pulse delay network is not activated when the DR output of the UART goes high. If the pulse delay network is not activated, the demodulator control logic does not respond to subsequent characters thereby ignoring all signals being applied to input terminal 901. Also the 0 output of flip-flop 937 applies a low to the DRR input of the UART via gate 950 and gate 951. This low causes the DR output of the UART to return low in preparation for subsequent input characters.

If the character processed by the UART is SOH (the first character in each reply message) it indicates that a reply message follows. The output of SOH detector 931 goes high and places flip-flop 937 in the SET state. This applies a low to one input of gate 926 which allows the high appearing on the DR output of the UART to apply a positive transition to the input of pulse delay network 923 via gates 925 and 926. In response thereto, the pulse delay network produces three pulses, P1, P2 and P3, as described above. A high is also applied to the DRR input of the UART via gate 950 and inverter 951. Therefore, the DR output of the UART remains high.

Pulse P1 is applied to the CLOCK input of word counter 924 via enabled gate 918. This advances the word counter to count 1 which does not effect other circuitry but merely prepares the word counter for advancement to count 2.

Pulse P2 is applied to one input of gate 947. This gate is at this time enabled as the output of UNAV detector 932 is low, thereby applying a high to one input of gate 947 via inverter 946, and the $\overline{CT2}$ and $\overline{CT4}$ outputs of word counter 924 are low so that the CT2 and CT4 outputs apply a high to the remaining two inputs of gate 947. Therefore, pulse P2 produces a "strobe" signal which is applied to the terminal display via output terminal 906 and line 330. In response thereto the terminal display accepts the character that is present on output terminal 904 (i.e., SOH). Pulse P2 is also applied to one input of LRC comparator 936 and in response thereto the character is added modulo-2 to the previously received character. (As this is the first character received, the previous character is defined as word 0000000.)

Pulse P3 applies a low to the DRR input of the UART via gates 950 and 951 which returns the DR output of the UART low in preparation for the second character in the reply message.

The second character received in the three replies from the central station is processed by the UART as described above and is either the TID character (reply No. 1 and No. 3) or the NAK character (reply No. 2). As the TID character is preset to identify a particular remote terminal it is possible that the TID character could be made equal to the NAK character, in which case the first two characters of all three replies would be identical. Reply No. 2 contains only two characters, SOH and NAK and in response to this reply the demodulator control logic must generate a "try again" signal as described above. Therefore, the remote terminal in responding to reply No. 2 must be able to identify this reply even though it could appear identical to the first two characters of the other two replies. This is accomplished as follows:

If the terminal TID character is not equal to the NAK character, the output of TID comparator 930 will remain low (as the incoming character would not be equal to the character generated by TID generator 929), applying a high to one input of gate 940 via inverter 934. At this same time, the DR output of the UART will go high and in response thereto the pulse delay network will generate three more pulses. Pulse P1 will advance word counter 924 to the count 2 state causing the CT2 output to go high, which applies a high to a second input of gate 940, enabling this gate, and a low via inverter 928 to one input of gate 947, disabling this gate. Pulse P2 is then applied to the remaining input of gate 940, generating the "try again" signal via gates 940, 942 and output terminal 905. Pulse P2 is also applied to one input of gate 947 but has no effect as this gate has been disabled. This prevents the generation of the "strobe" pulse, thereby blocking the NAK character from the terminal display. Pulse P3 resets the UART via gates 950 and 951 as described above, causing the DR output of the UART to go low. Subsequent to the NAK character, there is a loss of carrier as the NAK character is the last character in a "retry" reply. This causes input terminal 902 to go low and in turn this causes the output of inverter 917 to go high which applies a positive transition to the input of the pulse delay network via gates 925 and 926. Three more pulses are then generated. Pulse P1 advances the word counter to count 3 which has no effect. Pulse P2 is applied to the input of gate 935. The remaining input of gate 935 is at this time high due to the loss of carrier. Therefore, pulse P2 resets slip-flops 937 and 949, resets the word counter via gate 920, resets UART 921 via the MR input, and resets flip-flops 914 and 915 and the LRC comparator via gates 908 and 911. This prepares the demodulator control logic for subsequent replies from the central station. Pulse P3 occurs subsequent to pulse P2 but has no effect.

If the terminal TID character is equal to the NAK character, the output of the TID comparator will go high disabling gate 940 via inverter 934. This prevents the "try again" signal from being produced as described above. However, as described above, the arrival of the NAK character generates pulses P1, P2 and P3. Pulse P1 advances the word counter to the count 2 state. This applies a low to one input of gate 947, disabling this gate and a high to one input of gate 944 via gate 945. Pulses P2 and P3 have no effect. Subsequent to the NAK character, there is a loss of carrier which applies a high to the remaining input of gate 944, thereby enabling this gate and generating the "try again" signal via gates 944, 942 and output terminal 905. The loss of carrier also generates three more pulses, thereby resetting the demodulator control logic in preparation for the next reply message as described above.

The response of the DCL to the "data base unavailable" reply will now be described. The second character processed by the UART for the "data base unavailable reply" is the TID character. In response thereto the output of TID comparator 930 will go high, applying a low to one input of gate 940 via inverter 934, thereby disabling gate 940. The processing of the second character also generates three more pulses, P1, P2 and P3 as described above.

Pulse P1 advances the word counter to count 2 thereby disabling gate 947.

Pulse P2 enables the LRC comparator to add the second character modulo-2 to the first character received but does not generate a "strobe" pulse as gate 947 is disabled, and does not generate a "try again" signal as gate 940 is disabled.

Pulse P3 resets the UART via gates 950 and 951 in preparation for the next character. The third character decoded by the UART is UNAV. The output of UNAV detector 932 goes high, disabling gate 947 via inverter 946 and applying a high to one input of gate 948. Three more pulses are generated as described above.

Pulse P1 advances the word counter to count 3, the CT3 output goes high, applying a high to the second input of gate 948 and removing the low from one input of gate 947. This gate however remains disabled as described above.

Pulse P2 sets flip-flop 949 via enabled gate 948, thereby applying a "DBC busy" signal to the terminal display via output terminal 907. The operator of the terminal is thereby advised that the data base is unavailable and that he should try again later.

The output of flip-flop 949 going high resets flip-flops 914, 915 (disabling gate 918) and the LRC comparator via gate 908 and 911 and applies a high to one input of gate 919. Pulse P3 applied to enabled gate 919 then resets the word counter. Pulse P3 also resets the UART as described above. The remaining characters in the "data base unavailable" reply, STX, ETX and LRC are ignored by the demodulator control logic since flip-flops 914 and 915 have been reset. Upon loss of carrier, subsequent to the last character, gate 935 is enabled, as described above, and three more pulses are generated. Pulse P1 does not advance the word counter as gate 918 is disabled. Pulse P2 resets flip-flop 949, and the remaining demodulator control logic via enabled gate 935. Pulse P2 also generates a "strobe" pulse via gate 947 which however is ignored by terminal display 309 as it has already received the "DBC busy" signal.

The response of the DCL to the "normal" reply will now be described. The response of the demodulator control logic to the first two characters, SOH and TID, has been described above. The third character in the "normal" reply is STX. Three pulses are generated with the arrival of this character as described above. Pulse P1 advances the word counter to count 3 causing the CT3 output of the word counter to go high. This applies a high to one input of gate 909. The second input of gate 909 is also high due to the low on the output of the ETX detector which applies a high to gate 909 via inverter 913. Pulse P2 enables LRC comparator 936 adding STX modulo-2 to the previous two characters. Pulse P2 is also applied to one input of enabled gate 947. (Gate 947 is enabled as the output of UNAV detector 932 is low and the $\overline{CT2}$ and $\overline{CT4}$ outputs of the word counter are high.) In response thereto, a "strobe" pulse is applied to the terminal display via output terminal 906. The terminal display then accepts the STX character present on output terminal 904 which signals the terminal display of the start of the forthcoming test material.

Pulse P3 resets the UART via gates 950 and 951 as described above. Pulse P3 is also applied to one input of enabled gate 909. In response thereto flip-flop 915 is reset via gates 909 and 911. This in turn disables gate 918 which prevents the word counter from advancing beyond the count 3 state.

The UART now processes the incoming message text material. Each character processed by the UART generates the pulses P1, P2 and P3 as described above. Pulse P1 has no effect as gate 918 is disabled. Pulse P2 generates a "strobe" pulse which is applied to the terminal display via output terminal 906 as described above. In response to the strobe pulse the terminal accepts the text character present on output terminal 904 and displays it. Pulse P2 also enables the LRC comparator which adds each character received modulo-2 to the previous characters received. Pulse P3 resets the UART via gates 950 and 951 and also applies a reset pulse to flip-flop 915 which has no effect as the flip-flop is already in the reset state. This process will continue indefinitely until the ETX character is received which indicates the end of the text material.

When the ETX character is received, the output of ETX detector goes high which enables gate 912 and disables gate 909 via inverter 913. Three pulses are also generated by the pulse delay network.

Pulse P1 has no effect as gate 918 is still disabled.

Pulse P2 generates a "strobe" pulse and enables the LRC comparator as described above. Pulse P2 also sets flip-flop 915 via gates 912 (previously enabled) and 910.

Pulse P3 resets the UART but does not reset flip-flop 915 as gate 909 has been disabled.

The final character LRC is processed by the UART and applied to the input of LRC comparator 936. Three more pulses are generated. Pulse P1 advances the word counter to count 4 causing the $\overline{CT4}$ output to go high and the CT4 output to go low. The low is applied to one input of gate 947 thereby disabling this gate. The high is applied to one input of gate 939. Pulse P2 enables the LRC comparator but does not generate a strobe pulse as gate 947 has been disabled. The LRC comparator adds the LRC character, generated by the central station, to the previously received characters. If there have not been any errors during transmission, the modulo-2 sum of all the characters should now be zero. The output of the LRC comparator then goes high and disables gate 939 via inverter 938. Conversely, if there has been an error during transmission, the LRC check will fail and the output of the LRC comparator will remain low and apply a high to the input of gate 939 via inverter 938.

Pulse P3 then resets the UART as described above. In addition, if the LRC check has failed, pulse P3 will generate a "try again" signal via enabled gate 939, gate 942, and output terminal 905. This informs the operator that there has been an error and he must try again.

Subsequent to the LRC character there will be a loss of carrier. This will generate three more pulses and reset the demodulator control logic as described above.

There are several types of errors that are detected by the demodulator control logic, some of which have been described above. The response of the demodulator control logic to any error condition is the generation of a "try again" signal. The type and means of detection for each error condition are summarized as follows.

1. Parity error

A parity error in any character causes the PE output of the UART to go high when the character has been processed by the UART. This enables gate 941. Pulse P3 then generates a "try again" signal via enabled gate 941, gate 942 and output terminal 905.

2. LRC check

The failure of the LRC check has been described above.

3. TID error

The failure of the incoming TID character to match the terminal TID has been described above.

4. Loss of carrier

A loss of carrier before reaching the valid end of a message can occur at three different times.

If the loss of carrier occurs during the count one state of the word counter, the "try again" signal is generated via enabled gate 944, (i.e., carrier detect = high and CT1 = high), gate 942 and output terminal 905.

If the loss of carrier occurs during the count 2 state of the word counter, the "try again" signal is generated via enabled gate 944, (i.e., carrier detect = high and CT2 = high), gate 942 and output terminal 905.

If the loss of carrier occurs during count 3 of the word counter the "try again" signal is generated via enabled gate 943 (i.e., carrier detect = high and CT3 = high), gate 942 and output terminal 905. Recall, however, that if the third character is UNAV the word counter has been reset before loss of carrier and the "DBC busy" signal is generated as described above.

Before proceeding to the central station description, LRC comparator 936 will be described. Refer to FIG. 9A. Input terminals 952–958 carry the 7-bit characters from the output of UART 921 (FIG. 9). Input terminal 959 carries the reset pulse, input terminal 960 carries the P2 pulse and output terminal 976 carries the compare signal to inverter 938 (FIG. 9).

Flip-flops 968–974 are normally in the RESET state as a reset pulse is applied to their reset inputs at the conclusion of each reply as described above. Therefore a high is applied to each input of gate 975 causing a high to be applied to output terminal 976. This applies a low to one input of gate 939 (FIG. 9) via inverter 938 (FIG. 9) thereby disabling gate 939. This has no effect as described above.

The 7-bit characters processed by UART 921 (FIG. 9) are applied to input terminals 952–958 and are gated to the toggle inputs of flip-flops 968–974 in response to pulse P2. If the incoming bits are equal to logical 1 the respective flip-flops are toggled to the opposite state. Conversely, if the incoming bits are equal to logical 0, the flip-flops remain in the present state. In this manner, each character from the UART is added modulo-2 to the previous character, with the first character being added to the character 0000000 as flip-flops 968–974 begin in the RESET state.

When the first character is toggled into the flip-flops, some of the flip-flops are SET thereby disabling gate 975 and causing output terminal 976 to go low. This applies a high to one input of gate 939 (FIG. 9) via inverter 938 (FIG. 9). This has no effect as the CT4 input to gate 939 is at this time low, disabling the gate as described above.

At the end of the reply message from the central station, the modulo-2 sum of all information characters will be present in flip-flops 968–974. Character LRC, generated by the central station is then added modulo-2 to this sum. If there have not been any errors in any previous character, the addition of LRC to the previous character will sum to logical 0, placing flip-flops 968–974 in the RESET state and applying a high to output terminal 976. This signals a correct LRC check and effects the circuitry in FIG. 9 as described above. Conversely, if there have been errors in the previous characters, the addition of LRC will sum to something other than logical 0, applying a low to output terminal 976. This signals an incorrect LRC check and effects the circuitry in FIG. 9 as described above.

4.0 Central Station and Data Base Description

The functions of the central station have been described above. Physically, the central station is comprised of a minicomputer such as the Interdata Model 50/55 Communications Processor or any other minicomputer capable of performing the functions described above, and the necessary data sets needed to communicate with the multipoint switches and the data bases.

Refer to FIG. 1. The central station is designed to poll the remote terminals, to accept messages from the remote terminals for transmission to one of the data bases, and to assemble replies from the data bases for transmission to the selected remote terminal. The central station transmits polling sequences simultaneously over all signaling paths, such as signaling paths 105 and 106 to the remote terminals. Each signaling path has assigned thereto its own multipoint switches whereby the remote terminals assigned to that path are accessed. For example, the remote terminals assigned to path 105 are accessed via primary multipoint switch 107, and secondary multipoint switch 111. If replies are forthcoming from any remote terminal, polling will be suspended while the central station processes the reply. Thereafter, the polling sequence will resume. If the central station has messages from one of the data bases destined for a particular remote terminal, the message will be sent to the remote terminal as soon as possible after the message is received from the data base, i.e., upon the completion of the polling sequence in progress when the message is received.

The functions of the central station are accomplished by programming the minicomputer to perform in a specified manner. The flow charts shown in FIGS. 10 through 13 symbolically define the various functions performed by the minicomputer in polling all the remote terminals on one signaling path with all signaling paths being polled in the same manner. The circles shown in the flow charts represent entry and exit points. The various functions performed by the minicomputer are symbolically represented by rectangles, while diamond-shaped symbols define the decision making logic operation of the minicomputer.

Figure 10:
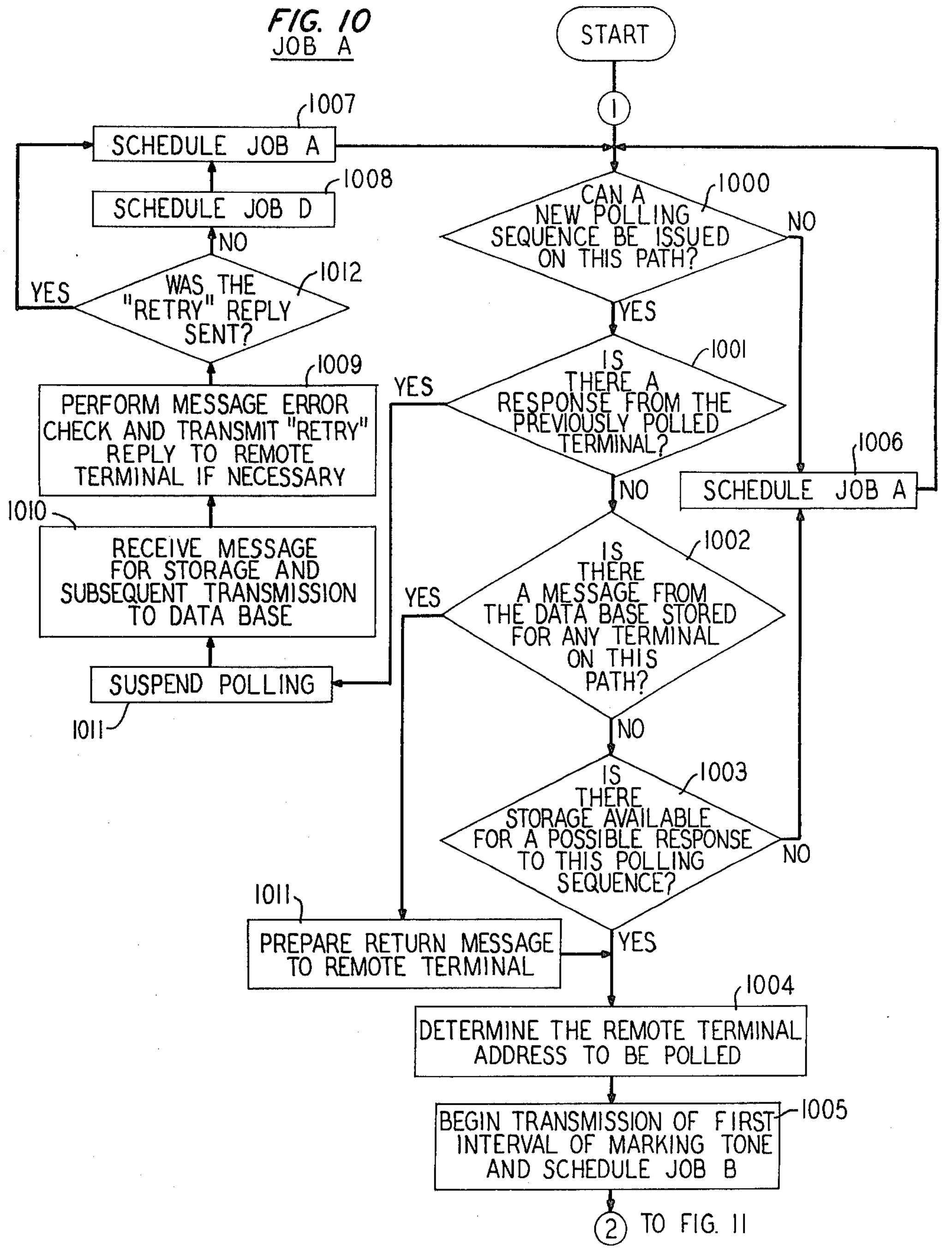
FIGS. 10–13 disclose a flow chart of the computer program utilized in the control station of the multipoint data communications system.
Figure 13:
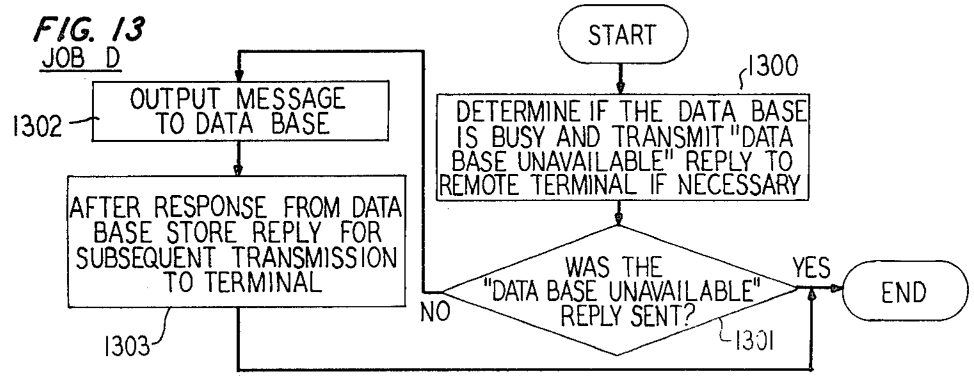
Figure 11:
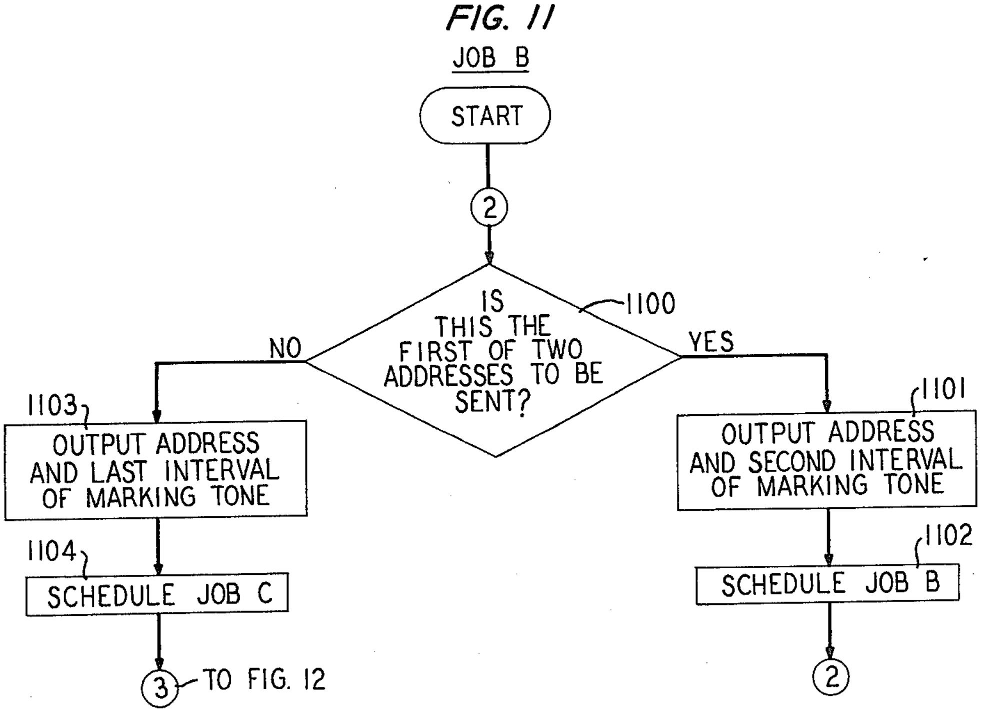
Figure 12:
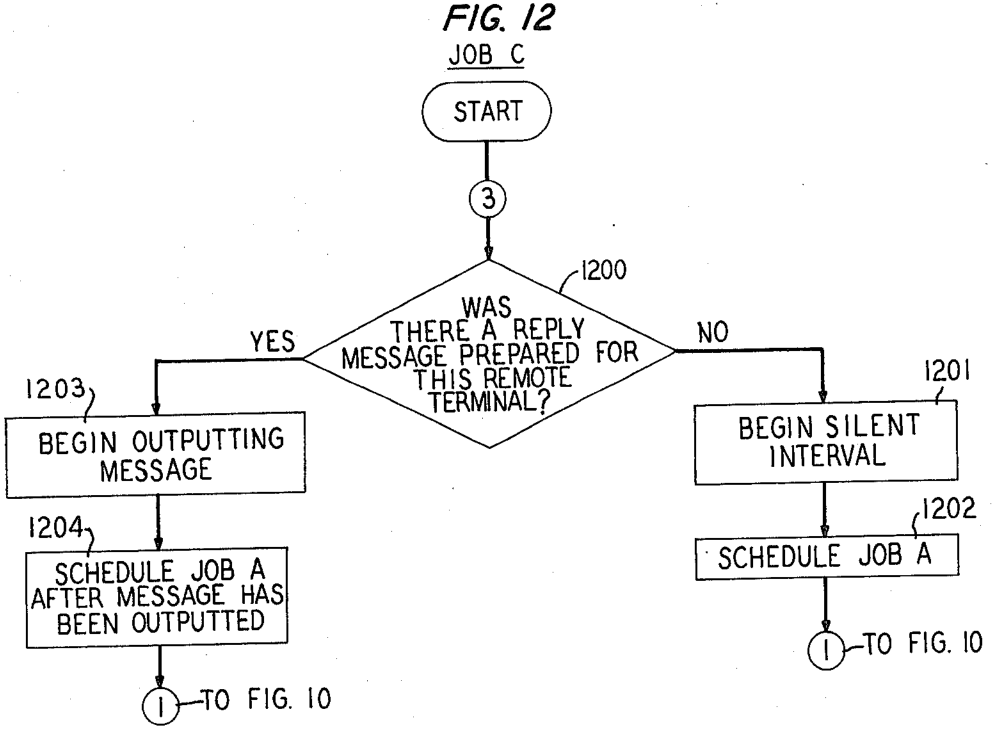

The functions performed by the minicomputer can be divided into four jobs: Job A, Job B, Job C, and Job D. Job A is shown in FIG. 10. It has primary responsibility for the majority of central station functions and is run every time a new polling sequence can be outputted on a particular signaling path. Job B is shown in FIG. 11 and has the responsibility for actually outputting the polling signals. Job C is shown in FIG. 12 and is used to begin the silent interval or to output messages onto the signaling path. Job D is shown in FIG. 13 and is used to communicate with the data bases.

The scheduling of the four jobs is derived from a programmable real-time clock internal to the minicomputer. Job A is scheduled to run every $x$ milliseconds where $x$ is equal to T/2. As T is equal to the interval required to transmit a polling signal (see FIG. 4) it can be seen that $x$ is much less than the interval required to complete a polling sequence. Jobs B, C and D are scheduled to run as needed as will be detailed hereinafter.

Refer to FIG. 10. Entry point 1 is the starting point for Job A. The first decision made by the central station is shown in block 1000 and concerns whether a new polling sequence can be issued for the particular path being considered at this time. As described above, this decision is made every $x$ milliseconds and is based on the status of the signaling path, i.e., is the path being used for transmitting messages to the remote terminal, receiving messages from the remote terminal, or is the path out of service. If the path is currently in use, or is out of service the program follows the "NO" branch to block 1006 and schedules Job A to run again. If a polling sequence can issue, the program takes the "YES" branch to block 1001.

Block 1001 determines whether there has been a response from the previously polled terminal. If there has been a response, the "YES" branch from block 1001 is taken, polling is suspended in block 1011, the central station receives and stores the message in block 1010, and an error check is made in block 1009. If necessary, the "retry" reply is transmitted to the remote terminal at this time. If the "retry" reply is sent, the "YES" branch from block 1012 is taken, Job A is rescheduled in block 1007 and the data base is not called. If the "retry" reply is not sent, the "NO" branch from block 1012 is taken and Job D is scheduled to run in block 1008. After the scheduling of Job D, Job A is rescheduled in block 1007.

Job D is shown in FIG. 13 and functions to communicate with the data bases. The minicomputer runs Job D as soon as possible after it is scheduled and exactly when it is run depends on the minicomputer load as that particular point in time. The minicomputer first determines if the data base is busy in block 1300. If it is, the "data base unavailable" reply is sent to the remote terminal and Job D is ended. Job A will be automatically rescheduled, as described above, and the polling sequence will continue. If the data base is not busy, the message is outputted to the data base in block 1302. Block 1303 shows that after processing by the data base, the reply message from the data base is stored for later transmission to the remote terminal. Job D is then ended and the message will be sent to the remote terinal when Job A is rescheduled as described above.

Returning now to block 1001, it is seen that the "NO" branch from block 1001 is taken when there is no response from the previously polled terminal. The next decision made by the central station is shown in block 1002 and determines if there is a reply message from the data base destined for the next terminal to be polled. If the answer is "YES," the program moves to block 1011, prepares the reply message, and returns to the main branch of the program. If the answer is "NO," the program moves to block 1003 and determines if there is sufficient storage available to receive a possible reply from the next terminal to be polled. If there is not sufficient storage, Job A will be rescheduled until sufficient storage becomes available. If there is sufficient storage, the program moves to block 1004.

Block 1004 determines the address of the remote terminal based on the TID character as described above. The program then moves to block 1005, begins transmission of the first interval of marking tone, and schedules Job B to be run.

Refer to FIG. 11. Therein is shown Job B which is scheduled to run at the conclusion of the transmission of the first interval of marking tone. Recall from what precedes that if the central station wishes to access a remote terminal located on a secondary switch, two addresses must be transmitted from the central station and if the remote terminal is located on a primary switch, only one address need be sent. (Once the primary switch is connected to a secondary switch, all the terminals connected to that secondary switch may be accessed with only one address.) Therefore, the first decision made by the minicomputer in Job B is whether the address of the remote terminal is the first of two addresses to be sent. If the answer is yes, the program moves to block 1001, transmits one address, and the second interval of marking tone, and reschedules Job B. The program returns to block 1100 and this time the second of two addresses is to be sent so that the "NO" branch is taken. The "NO" branch is also taken when there is only one address to be sent.

The program proceeds down the "NO" branch to block 1103 wherein the address is outputted and the last interval of marking tone is sent. Thereafter, Job C is scheduled to run in block 1104.

Job C is shown in FIG. 12. The first decision is made in block 1200 and determines if there was a reply message prepared for the terminal about to be accessed. (See block 1011, FIG. 10). If there was a message prepared, the transmission begins in block 1203. Job A is rescheduled after the message has been transmitted in block 1204. If there is no message to send, it means that a normal polling sequence is to be transmitted, the "NO" branch is taken from block 1204, and the silent interval is begun in block 1201. Job A is rescheduled in block 1202.

A listing of a program for providing the previously detailed flow charts is shown in the attached appendix. The program language is the assembly language for the Interdata Model 50/55 Communications Processor. The language is disclosed in a manual published by Interdata, Inc. entitled "Model 50/55 Communications Processor Reference Manual." The publication number is 29-249RO1.

The data bases shown in FIG. 1 can be any storage medium capable of performing the functions described above. They must simply be capable of receiving a message from the central station, accessing a storage location in response thereto, and transmitting a reply to the central station. Such storage arrangements are well known and will not be further detailed.

Although a specific embodiment of this invention has been shown and described, it will be understood that various modifications may be made without departing from the spirit of this invention.

APPENDIX

```
***
* REAL TIME CLOCK INTERRUPTS EVERY 406.25 MICROSECONDS
***
P1      DC      63          P1 IS LINE SEQUENCE STORAGE
                            WORD
RTC00   LH      9,P1
        SIS     9,4
```

APPENDIX-continued

```
        BNMS    RTC01           NOT MODULO, BR
        LHI     9,NOX4          WE USE 4XLOGICAL LINE NO
RTC01   STH     9,P1            STORE RSULT
        LIS     10,1
        WHR     10,9
***
* DOES JOB "A" HAVE TO BE DONE?
***
PA00    LB      10, STATUS(9)   INDEX INTO STATUS TBL
        LHR     10,10           IF ZERO STATUS, JOB "A"MUST BE
                                DONE
        BNZ     RTC02           NONZERO, BR
***
* DETERMINE BEFORE POLLING IF RETURN MSG WAITING
***
PA01    LHR     0,9             FIRST, CHECK ADAPTER
        SRLS    0,1
        TLATE   0,TREAD         GET READ DEVICE CODE

***
* SEE IF CARRIER WAS RECEIVED, IF SO
*SET UP TO RECEIVE MESSAGE, IF NOT, POLL
***
        SSR     0,11            CHECK CONTROLLER STATUS
        THI     11,2            CARRIER UP?
        BE      CUP00           YES, RECEIVE MESG
        OC      0,RTOW          BRING UP RQ2S WITH WRITE
                                DISABLED
PA02    LH      11,RETMSG(9)    RETURN MSG WAITING?
        BNZ     PA15            YES BRANCH
***
* NO, THEN WE'LL POLL BUT FIRST SEE IF A BLOCK IS
*AVAILABLE TO RECEIVE POSSIBLE RESPONSE
***
PA03    LH      11,AVTBLK       GET BLOCK COUNT
        NHI     11,X'FF'        AT LEAST 1 BLK AVAILABLE?
        BE      COUNT           NO, BRANCH
        LIS     13,2
        AHM     13,PLLTBL(9)    INCR POLL ADDRESS TO TERM
***
* GET NEXT VALID TERMINAL TO BE POLLED
***
PA04    LH      11,PLLTBL(9)    GET LAST TERM PLLD'S ADDR
        LH      12,0(11)        GET TERM ID
        BNZS    PA07            IF NOT END OF POLL CYCLE, BR
PA06    LH      11,START1(9)    YES RESTART CYCLE
        LH      12,0(11)        GET FIRST TERM ID
        STH     11,PLLTBL(9)
PA07    BNP     UNHUNH          IF TID OUT OF CYCLE OR 0, DROP
                                RQ2S
***
* GET 2 BYTE POLL FROM TERM ID IN R12, R12=TERM ID/XX
***
PA09    EXBR    12,12           R12 NOW=XX/TERM ID
        LBR     14,12           ZERO LEFT BYTE
        AHR     14,14           DOUBLE TERM ID FOR INDEXING
        LH      13,IDADDR(9)    GET SWITCH ADDR START
        AHR     13,14           INDEX INTO LIST
        LH      13,0(13)
        BMS     PA10
***
* NORMALLY BP PA10 SINCE AGAIN CHECK FOR GOOD TERMINAL
*FOR DEMO, CAN NOT MAKE THIS TEST, CAN BE MADE BM
***
RESET   LHI     14,X'8000       CAN'T POLL, RESET TERM ID
        OHM     14,0(11)        NOW TERM ID TBL SET FOR NO POLL
UN-     LIS     14,1            DROP RQ2S IN 6 MS
HUNH
        STB     14,STATUS(9)
        SHR     14,14           SEND 2 BYTE POLL
        STH     14,PLLADR(9)
        B       RTC02
***
* AGAIN CHECKED FOR BAD TERMINAL, IF GOOD
* R13=SWITCH ADDRESS, RIGHT BYTE IS PRIMARY
*LEFT BYTE IS SECONDARY ADDRESS
***
* CHECK PRIMARY TO SEE IF 1 BYTE POLL OR 2 BYTES
*SET APPROPRIATE STATUS
*IF ONLY ONE SWITCH POLL, BIT 1 IS SET
***
PA10    CLB     13,PADDR1(9)    WAS LAST PRIMARY THE SAME?
        BES     PA13            YES, BR
PA11    THI     13,PRIMARY      PRIMARY BIT SET IN SEC. POSITION?
        BNES    PA13            YES, JUST OUTPUT 1 POLL BYTE
PA12    LHI     14,X'300'       NO, SET STATUS FOR 2 BYTE POLL
        BS      PR14
PA13    LHI     14,X'200'       SET STATUS FOR 1 BYTE POLL
PA14    STH     13,PLLADR(9)    STORE SWITCH ADDR
        STBR    12,14           R14=STATUS/TERM ID
        STH     14,STATUS(9)
***
* GET LOGICAL LINE NUMBER OF THE LINE FOR JOB B OR C
```

```
***
RTC02  LHR    10,9
       SHI    10,200
       BMS    RTC03          MUST AGAIN DO MOD ARITH
       SHI    9,256
RTC03  AHI    9,56
***
* DO JOBS B OR C NEED DOING?
***
PB00   LH     10, STATUS(9)  GET STATUS
       BM     TIMEOUT        NOT POLLING, DO TIMEOUT
PB01   EXBR   11,10
       NHI    11,X'F'
       TLATE  11,TBC         DO WHAT JOB?
WHA-   DC     PLLEND, PC01,PB03,PB02,PC10,PB03,PB02,SET1
TBC
       DC     SUB 1, SUB 1, SUB 1, SUB 1, SUB 1, SUB 1, SUB 1, SUB 1
       LIS    13,1
SET1
       STB    13,STATUS(9)
       RPSW
SUB1   SHI    10,X'100
       STH    10,STATUS(9)
       RPSW
***
* INSERT HERE THE ROUTINE TO SET UP RETURN MESSAGE
***
PA15   LB     12,1(11)    R12=TID
*      NHI    12,X'3F' PROBABLY NEED THIS NORMALLY
       LBR    11,12
       AHR    11,11
       LH     12,IDADDR(9)
       AHR    13,11       GET INDEX INTO TABLE
       LH     13,0(13)
PA16   CLB    13,PADDR1(9)
       BES    PA18
PA17   LHI    14,X'600'
       BS     PA19
PA18   LHI    14,X'500'
PA19   STH    13,PLLADR(9)
       STBR   12,14
       STH    14,STATUS(9)
       B      RTC02
***
* PB02 SENDS PRIMARY POLL, PB03 THE SECONDARY POLL
***
PB02   LB     11,PADDRI(9)
       BS     PB04
PB03   LB     11,PLLADR(9)   SEND SECONDARY POLL
PB04   LBR    0,9
       SRLS   0,1
       TLATE  0,TWRITE       GET WRITE DEVICE CODE
       SSR    0,15
***
* CHECK CONTROLLER STATUS FOR CL2S, DATA SET DOWN &
* OVERFLOW INDICATING CAN'T SEND BYTE YET
***
       THI    15,8           "BUSY SET"
       BE     PB10
PB05   THI    15,X'44'       DATA SET OR CL2S DOWN
       BNES   PB07
       RPSW
PB07   LHI    11,C'W'
       EXBR   15,15
       AHR    0,15
       B      LDWN00
PB10   WDR    0,11
       SHI    10,X'100       RESET STATUS
       STH    10,STATUS(9)
       RPSW
***
* TURN ADAPTER FROM WRITE TO READ LOOKING FOR RESPONSE
*FROM THE TERMINAL
***
PC01   SHR    10,10
       STB    10,STATUS(9)   SET ZERO STATUS
       LH     15,ADSTR(9)
       AIS    15,1
       SRLS   9,1
       TLATE  9,TWRPSW       GET WRITE DEVICE CODE
       OC     9,WTOR         DROP RQ2S(3)
       AHR    9,9
       STH    15,X'D0(9)
       RPSW
***
* SET UP WRITE DRIVER TO SEND RETURN MESSAGE
*AND ENABLE INTERRUPTS
***
PC10   LH     15,ADSTW(9)    GET WRITE DRIVER ADDRESS
       LH     14,RETMSG(9)   GET START OR RET MSG
       STH    14,4(15)       STORE START
       AHI    14,SENDF       GET FINAL ADDR
       STH    14,6(15)       STORE FINAL
```

APPENDIX-continued

```
PC11   LHI     13,SNDSTS     GET SENDING STAT
       STB     13,STATUS(9)  STORE IT
       OC      9,AWENAB      ENABLE INTERRUPTS
       AIS     15,1
       AHR     9,9
       STH     15,X'D0(9)
PLLE-  RPSW
ND
***
* COUNT NUMBER OF TIMES ROUTINE CANNOT POLL DUE TO
*NO AVAILABLE STORAGE BLOCKS
***
       LCS     11,1
OUNT
       AHM     11,NOPLL
       BNZ     RT02
       LHI     11,C'S'
       LHI     12,X'7FF'
       STH     12,NOPLL      RESET COUNT

       B       LDWN01
CUP00  LH      15,ADSTR(9)
       B       CUP02
***
*BRANCH TO RECEIVE MESSAGE ROUTINE
```

We claim:

1. In a multipoint data communications system, a multipoint switch including means responsive to each of a plurality of polling signal sequences on a signaling path from a central station for extending the signaling path to a selected one of a plurality of remote terminals, the multipoint switch further including means responsive to the polling sequence for blinding the multipoint switch to signals on the signaling path, characterized in that the blinding means further includes means for unblinding the multipoint switch in response to the absence of signals on the signaling path for a predetermined interval.

2. In a multipoint data communications system, in accordance with claim 1, wherein each of the plurality of polling sequences includes a remote terminal address portion defining a selected one of the remote terminals and a remote terminal command portion common to all remote terminals, the multipoint switch further including means responsive to the remote terminal address portion for enabling the extending means and the selected remote terminal including means responsive to the remote terminal command portion for communicating with the central station.

3. In a multipoint data communications system, in accordance with claim 2, wherein the remote terminal command portion includes a single frequency tone of constant duration dollowed by a silent interval of constant duration, the single frequency tone and the silent interval being common to each remote terminal command portion, the remote terminal further including means responsive to the single frequency tone followed by the silent interval for enabling the communicating means.

4. In a multipoint data communications system, in accordance with claim 2, wherein the communicating means includes means responsive to the remote terminal enabling means for transmitting data messages to the central station, means for determining the end of each message transmitted to the central station and means jointly responsive to the remote terminal enabling means and to the determining means for receiving data messages from the central station.

5. In a multipoint data communications system, in accordance with claim 1, wherein the multipoint switch further includes means for detecting signal transmission sequences on the signaling path longer in duration than a predetermined maximum duration of time, and means responsive to the detection of the transmission sequences exceeding the predetermined maximum duration of time for breaking the signaling path.

6. A multipoint data communications system, including a central station, a multipoint switch and a plurality of remote terminals, the central station including means for transmitting a polling sequence onto a signaling path to select one of the plurality of remote terminals, the polling sequence including a remote termial address portion defining the selected one of the remote terminals and a remote terminal command portion common to all remote terminals, the system further including, means included in the multipoint switch and responsive to the remote terminal address portion for extending the signaling path to the selected one of the remote terminals defined by the remote terminal address portion, and means included in the selected remote terminal and responsive to the remote terminal command portion for communicating with the central station.

7. A multipoint data communications system in accordance with claim 6 wherein the remote terminal command portion includes a single frequency tone of constant duration followed by a silent interval of constant duration, the single frequency tone and the silent interval being common to each remote terminal command portion, the remote terminal further including means responsive to the single frequency tone followed by the silent interval for enabling the communicating means.

8. A multipoint data communications system in accordance with claim 6 wherein the multipoint switch further includes means responsive to the remote terminal address portion for blinding the multipoint switch to signals on the signaling path, the blinding means including means for unblinding the multipoint switch in response to the absence of signals on the signaling path for a fixed interval of time.

9. A multipoint data communications system in accordance with claim 8 wherein the remote terminal further includes means for transmitting data messages to the central station, means for determining the end of each data message transmitted to the central station, and means jointly responsive to the enabling means and to the determining means for receiving data messages from the central station.

10. A multipoint data communications system in accordance with claim 6 wherein the multipoint switch further includes means for detecting signal transmission sequences on the signaling path greater in duration than a predetermined maximum duration of time, and means responsive to the detection of the transmission sequences exceed the predetermined maximum duration of time for breaking the signaling path.

11. In a multipoint data communications system, a central station, a multipoint switch and a plurality of remote terminals, the multipoint switch including means responsive to each of a plurality of polling signal sequences on a signaling path from the central station for extending the signaling path to a selected one of the plurality of remote terminals, each remote terminal including means for transmitting data messages on the signaling path to the central station and means for receiving data messages on the signaling path from the central station, the remote terminal further including, means for detecting the extension of the signaling path to the selected remote terminal, means for determining the end of each data message transmitted to the central station, and means jointly responsive to the determining means and to the detecting means for enabling the receiving means.

12. In a multipoint data communications system, in accordance with claim 11, wherein the polling sequence includes a remote terminal address portion defining an individual one of the plurality of remote terminals and a remote terminal command portion common to all remote terminals, the system further including a multipoint switch including means responsive to the remote terminal address portion for extending the signaling path to the individual remote terminal, the multipoint switch further including means responsive to the remote terminal address portion for blinding the multipoint switch to signals on the signaling path and means for unblinding the multipoint switch in response to the absence of signals on the signaling path for a predetermined interval of time.

13. In a multipoint data communications system, in accordance with claim 12, wherein the remote terminal command portion includes a single frequency tone of constant duration followed by a silent interval of constant duration, the single frequency tone and the silent interval being common to each remote terminal command portion, the remote terminal further including means responsive to the single frequency tone followed by the silent interval for enabling communication apparatus at the central station.

14. In a multipoint data communications system, in accordance with claim 11, wherein the multipoint switch further includes means for detecting signal transmission sequences on the signaling path greater in duration than a predetermined maximum duration of time, and means responsive to the detection of the transmission sequences exceeding the predetermined maximum duration of time for breaking the signaling path.

15. A multipoint data communications system including a central station, a multipoint switch and a plurality of remote terminals, the multipoint switch including means responsive to a polling signal sequence transmitted on a signaling path from the central station for extending the signaling path from the multipoint switch to a selected one of the plurality of remote terminals, and polling sequence including a remote terminal address portion defining the selected one of the remote terminals and a remote terminal command portion common to all remote terminals, the system further including, means responsive to the remote terminal address portion for blinding the multipoint switch to signals on the signaling path for an interval of time, and means included in the remote terminal and responsive to the remote terminal command portion for communicating with the central station.

16. A multipoint data communications system, in accordance with claim 15, wherein the remote terminal command portion includes a single frequency tone of constant duration followed by a silent interval of constant duration, the single frequency tone and the silent interval being common to each remote terminal command portion, the remote terminal further including means responsive to the single frequency tone followed by the silent interval for enabling the communicating means.

17. A multipoint data communications system in accordance with claim 16 wherein the remote terminal further includes means responsive to the enabling means for transmitting data messages to the central station, means for determining the end of each data message transmitted to the central station, and means jointly responsive to the enabling means and to the determining means for receiving data messages from the central station.

18. A multipoint data communications system in accordance with claim 15 wherein the multipoint switch further includes means for detecting signal transmission sequences on the signaling path greater in duration than a predetermined maximum duration of time, and means responsive to the detection of the transmission sequences exceeding the predetermined maximum duration of time for breaking the signaling path.

19. A method for establishing a signaling path between a plurality of remote terminals and a central station, comprising the steps of, transmitting terminal selection signals on a signaling path from the central station to a multipoint switch, extending the signaling path from the multipoint switch to the remote terminal defined by the terminal selection signals, blinding the multipoint switch to signals on the extended signaling path, detecting the absence of signals on the extended signaling path for a predetermined interval of time, and unblinding the multipoint switch.

20. A method for establishing a signaling path in accordance with claim 19 wherein the terminal selection signals include a terminal address portion defining a selected one of the remote terminals and a terminal command portion common to all remote terminals, the method further including the steps of, detecting the occurrence of the terminal command portion followed by the absence of signals on the signaling path and enabling communications apparatus at the selected remote terminal defined by the terminal address portion.

21. A method for polling a plurality of remote terminals from a central station, comprising the steps of, transmitting a polling signal on a signaling path from the central station to a multipoint switch, suppressing transmission from the central station for a predetermined silent interval subsequent to each polling signal, extending the signaling path from the multipoint switch to a selected one of the plurality of remote terminals, detecting the occurrence of a common portion of the polling signal followed by the silent interval, and enabling communication apparatus at the selected remote terminal.

22. A method for polling in accordance with claim 21 wherein the extending step further includes the steps of, blinding the multipoint switch to signals on the extended signaling path, detecting the absence of signals on the extended signaling path for a predetermined interval of time and unblinding the multipoint switch.

23. A multipoint data communications system including a central station, a primary multipoint switch, a plurality of secondary multipoint switches and a plurality of remote terminals, the central station including means for transmitting a primary polling sequence onto the signaling path followed by a secondary polling sequence, the primary polling sequence including a multipoint switch address portion defining a selected one of the secondary multipoint switches, the secondary polling sequence including a remote terminal address portion defining a selected one of the remote terminals and a remote terminal command portion common to all remote terminals, the primary multipoint switch including means responsive to the multipoint switch address portion for extending the primary multipoint switch to the secondary multipoint switch, the secondary multipoint switch including means responsive to the remote terminal address portion for further extending the extended signaling path from the secondary multipoint switch to a selected one of the plurality of remote terminals, the system further including, means included in the primary multipoint switch and responsive to the multipoint switch address portion for blinding the primary multipoint switch to signals on the extended signaling path, means included in the secondary multipoint switch and responsive to the remote terminal address portion for blinding the secondary multipoint switch to signals on the further extended signaling path, and means included in the remote terminal and responsive to the remote terminal command portion for communicating with the central station.

24. A multipoint data communications system in accordance with claim 23 wherein the primary and secondary multipoint switches further include means for unblinding the primary and secondary multipoint switches in response to the absence of signals on the signaling path for a predetermined interval of time.

25. A multipoint data communications system, in accordance with claim 23, wherein the remote terminal command portion includes a single frequency tone of constant duration followed by a silent interval of constant duration, the single frequency tone and the silent interval being common to each remote terminal command portion, the remote terminal further including means responsive to the single frequency tone followed by the silent interval for enabling the communicating means.

26. A multipoint data communications system in accordance with claim 25 wherein the remote terminal further includes means responsive to the enabling means for transmitting data messages to the central station, means for determining the end of each data message transmitted to the central station, and means jointly responsive to the enabling means and to the determining means for receiving data messages from the central station.

27. A multipoint data communications system in accordance with claim 26 wherein both the primary and secondary multipoint switches further include means for detecting signal transmission sequences on the signaling path greater in duration than a predetermined maximum duration of time, and means responsive to the detection of the transmission sequences exceeding the predetermined maximum duration of time for breaking the signaling path.

* * * * *